US 6,687,283 B2

(12) United States Patent  (10) Patent No.: US 6,687,283 B2
Naoe                       (45) Date of Patent:    Feb. 3, 2004

(54) MULTI-BEAM SOURCE UNIT, ADJUSTING METHOD FOR SAME, POSITIONING JIG FOR SAME, ASSEMBLING METHOD FOR SAME, AND IMAGE FORMING APPARATUS HAVING SAME

(75) Inventor: Yasuhiro Naoe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 555 days.

(21) Appl. No.: 09/731,723

(22) Filed: Dec. 8, 2000

(65) Prior Publication Data

US 2001/0014108 A1 Aug. 16, 2001

(30) Foreign Application Priority Data

Dec. 8, 1999 (JP) ............................................. 11-348938

(51) Int. Cl.[7] .................................................. H01S 3/08
(52) U.S. Cl. ........................ 372/107; 372/101; 362/259
(58) Field of Search ................................. 372/107, 101, 372/65; 362/259

(56) References Cited

U.S. PATENT DOCUMENTS

| 4,661,959 | A | * | 4/1987 | Kaneko | 372/34 |
| 5,048,050 | A | * | 9/1991 | Komurasaki | 372/101 |
| 5,448,587 | A | * | 9/1995 | Huang | 372/107 |
| 5,758,050 | A | * | 5/1998 | Brady et al. | 714/1 |
| 5,758,950 | A | | 6/1998 | Naoe et al. | |
| 5,997,153 | A | | 12/1999 | Naoe et al. | |
| 6,097,749 | A | * | 8/2000 | Naoe et al. | 372/103 |
| 6,179,445 | B1 | * | 1/2001 | Naoe et al. | 362/259 |
| 6,299,331 | B1 | * | 10/2001 | Naoe et al. | 362/259 |

OTHER PUBLICATIONS

U.S. patent application Ser. No. 09/394,873, filed Sep. 13, 1999, pending.

* cited by examiner

Primary Examiner—Leon Scott, Jr.
(74) Attorney, Agent, or Firm—Oblon, Spivak, McClelland, Maier & Neustadt, P.C.

(57) ABSTRACT

A multi-beam source unit is disclosed wherein an arranged direction of light emitting points of a multi-beam laser diode relative to a horizontal scanning direction of a scanning optical system can be aligned with a predetermined standard design line. In this multi-beam source unit, a base member (30) is formed with a pressing plate mounting portion (41) which has a fitting hole (42) and which supports a multi-beam laser diode (31) rotatably, a cutout portion (47) for aligning the direction of a virtual straight line with the direction of a standard design line is formed in a stem (31B), a positioning groove (41A) which cooperates with the cutout portion (47) to align the direction of the virtual straight line with the direction of the standard design line is formed in the pressing plate mounting portion (41) as a mounting seat portion, a tip of jig (70) inserted through the positioning groove (41A) is brought into engagement with the cutout portion (47), and in this aligned state of the cutout portion (47) with the positioning groove (41A) the multi-beam diode (31) is pressed and fixed to the base member (30) by means of a pressing plate (40) which presses a back side of the stem 31B.

8 Claims, 25 Drawing Sheets

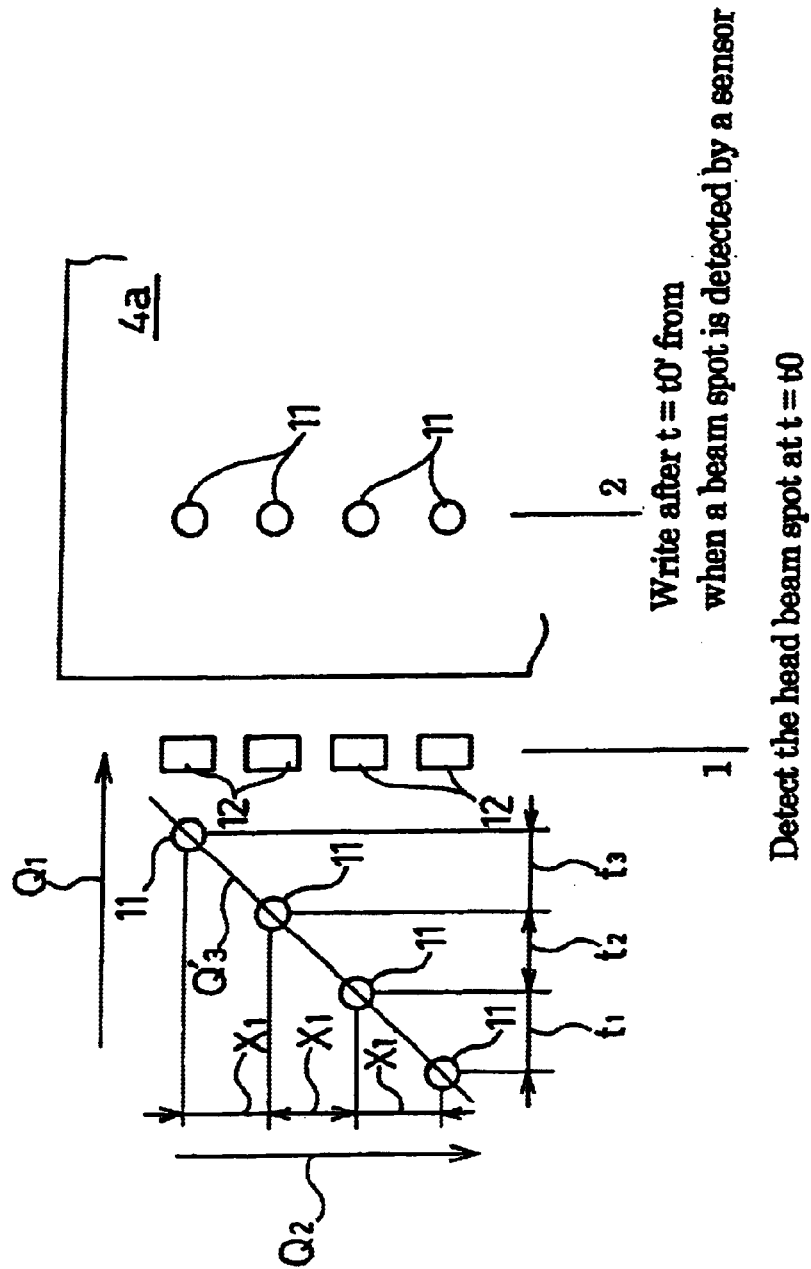

Detect the head beam spot 11 at t = t0

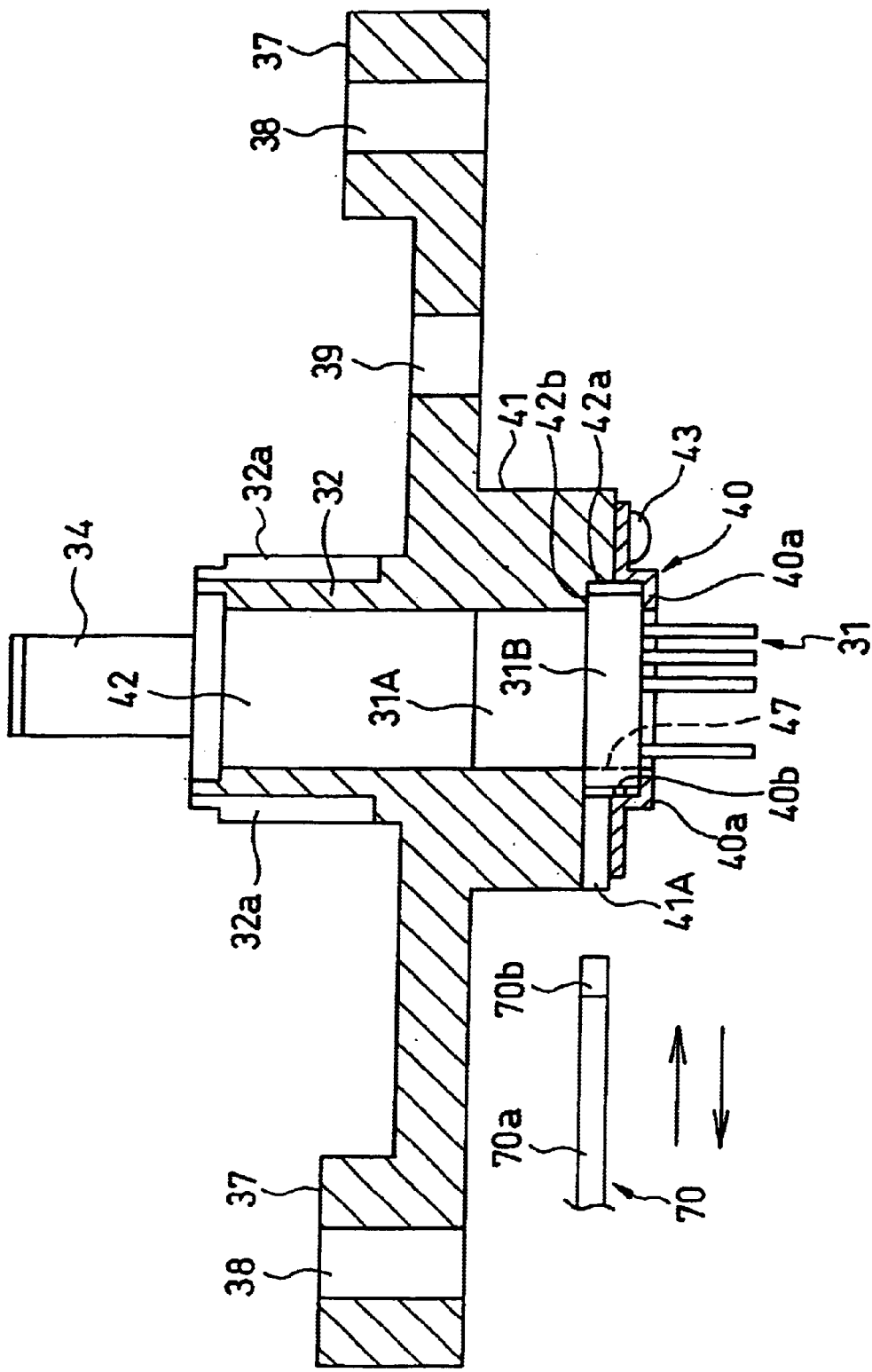

MULTI-BEAM SOURCE UNIT, ADJUSTING METHOD FOR SAME, POSITIONING JIG FOR SAME, ASSEMBLING METHOD FOR SAME, AND IMAGE FORMING APPARATUS HAVING SAME

BACKGROUND OF THE INVENTION

1. Field of the Invention

The present invention relates to a multi-beam source unit for use in an image forming apparatus such as a digital copying machine or a laser printer. Particularly, the invention is concerned with a multi-beam source unit, an adjusting method for the same, a positioning jig for the same, an assembling method for the same, and an image forming apparatus having the same.

2. Description of the Prior Art

Heretofore, as an image forming apparatus such as a digital copying machine or a laser printer there has been know an image forming apparatus with a laser scanning optical system mounted thereon. With the recent tendency to a higher write accuracy and a higher write speed, a laser scanning optical system using a multi-beam laser diode is becoming most popular.

FIG. 1 illustrates such a laser scanning optical system schematically. In the same figure, the reference numeral 1 denotes a multi-beam source unit, numeral 2 denotes a polygon mirror, numeral 3 denotes a fθ lens, and numeral 4 denotes a photosensitive member (also called an image recording medium). The multi-beam source unit 1 substantially comprises a multi-beam laser diode 5 and a collimator lens 6. The multi-beam laser diode 5 has a plurality of light emitting points to emit multi-laser beams P. The multi-laser beams P are collimated by means of a collimator lens 6, then are reflected by the polygon mirror 2 and are conducted onto a surface (also called an image recording surface) 4a of the photosensitive member 4.

The polygon mirror 2 and the fθ lens 3 constitute a part of a scanning optical system. On the surface 4a of the photosensitive member 4, as shown in FIG. 2, the multi-laser beams P are scanned in a horizontal scanning direction Q1 while leaving predetermined pitches X1 in a vertical scanning direction Q2 which is perpendicular to the horizontal scanning direction Q1. In this type of a laser scanning optical system, the surface 4a of the photosensitive member 4 i scanned over a large number of line at a time to write data onto the surface 4a.

As the write accuracy and speed have recently become higher, the laser scanning optical system is required to be improved in its accuracy for the diameter of a beam spot 11 of each multi-laser beam P, collimatability of the beams, a pitch X1 between adjacent beam spots 11 in the vertical scanning direction Q2, and a write start position in the horizontal scanning direction Q1. The accuracy required is becoming more and more strict as a higher image quality is required.

As shown in FIG. 3, the multi-beam laser diode 5 has a light emitting section 7 in the interior thereof. In the light emitting section 7 are provided a plurality of light emitting points, which are, for example, four light emitting points 7a–7d. The light emitting points 7a–7d are arranged on a designwise predetermined virtual straight line Q3 spacedly from one another. The straight line Q3 is obtained by joining acute points 9a and 10a of a pair of acute-angled cutout portions 9 and 10 which are formed in a metallic stem 8 of the multi-beam laser diode 5.

In the conventional multi-beam laser diode 5, the light emitting points 7a–7d are spaced widely from one another, so that when multi-laser beams are protected onto the surface 4a of the photosensitive member 4, the pitches X1 of their beam spots 11 in the vertical scanning direction Q2 become large and the image quality becomes coat. For avoiding such an inconvenience, as shown in FIG. 4, the multi-beam laser diode 5 is turned around the optical axis of the scanning optical system (not shown) so that an arranged direction (straight line) Q3' of the beam spots 11 become oblique with respect to the horizontal scanning direction Q1 on the surface 4a of the photosensitive member 4, thereby adjusting the pitches X1 in the vertical scanning direction Q2 to enhance the write density (recording density) in the vertical direction Q2 and improve the image quality.

However, if the multi-beam laser diode 5 is turned so that the arranged direction (straight line) Q3' of the beam spots 11 is deviated obliquely with respect to the vertical direction Q2, to improve the write density, then in the case where the light emitting its 7a–7d are driven simultaneously to effect write, this results in that write positions in the horizontal scanning direction Q1 of the beam spots 11 on the surface 4a of the photosensitive member 4 become displaced and hence the image quality is deteriorated.

In the laser optical system of this type, for making the write start positions of the beam spots on the surface 4a of the photosensitive member 4 uniform, for example sensors 12 for detecting scan positions of the laser beams able arranged correspondingly to the laser beams and the emission of beam from each of the light emitting points 7a–7d is controlled in accordance with a light receiving timing of each sensor 12.

More particularly, the emission of light from the light emitting points 7a–7d is controlled upon the lapse of time t0' after the detection of the head beam spot 11 at time t=t0, thereby making write start positions in the horizontal scanning direction Q1 on the surface 4a of the photosensitive member 4 uniform.

Moreover, instead of using sensors 12 correspondingly to the light emitting points 7a–7d a sensor 12 is provided correspondingly to the head beam spot 11 in the horizontal scanning direction Q1, as shown in FIG. 5(a), then tie lags t1, t2, and t3 of beam spots 11 are determined in advance, and as shown in FIG. 5(b), after the head beam spot 11 has been detected by the sensor 12, the emission of beams from the remaining light emitting points 7b–7d is delayed correspondingly to the time lags by means of a delay control circuit (not shown), thereby making the beam spots 11 uniform in the veil scanning direction at the write start positions on the surface 4a of the photosensitive member 4, as shown in FIG. 5(a).

In this laser scanning optical system, however, the control circuit used for aligning write start position is complicated, with consequent increase of cost.

At present, a multi-beam laser diode 5 with light emitting points 7a–7d spaced more narrowly than before is being developed. In a multi-beam source unit having such a multi-beam Laser diode 5 it is presumed that positional variations of the light emitting points 7a–7d will be small. Further, the multi-beam source unit is probably designed so as to be set to a scanning optical stem on the assumption that light emitting its 7a–7d are arranged in the direction of a predetermined standard design line when they are present on the virtual straight line Q3 defined by a pair of cutout portions 9 and 10, and is attached as it is to a body portion of an forming apparatus.

Even with such a design, however, due to errors in the manufacturing process of the multi-beam laser diode 5 being considered, it is rarely the case that the light emitting points 7a–7d are positioned on the virtual straight line Q3 without error. Even if there exists an arrangement direction (slit line) Q4 joining light emitting points 7a–7d, as shown in FIG. 6(A), the arrangement direction Q4 and the virtual straight line Q3 are sightly inclined with to each other and thus aligning the arrangement direction of the light emitting points 7a–7d with the direction of the standard design line without the need of any adjustment is difficult. The reference mark θ represents the angle of that inclination. FIG. 6(B) shows an ideal arrangement of beam spots 11 and FIG. 6(C) shows an arrangement of beam spots 11 in case of a large inclination angle θ.

When the multi-beam laser diode 5 is to be mounted to an apparatus body with a scanning optical system mounted thereon, site there exists a mounting error, it is desirable to turn the multi-beam laser diode 5 around the optical axis so that the arrangement direction of the light emitting points is at a predetermined angle relative to the vertical scanning direction Q2.

SUMMARY OF THE INVENTION

The present invention has been accomplished in view of the above circumstances and it is an object of the invention to provide a multi-beam source unit wherein an arranged direction of light emitting points of a multi-beam laser diode relative to a horizontal scanning direction of a scanning optical system can be aligned with a predetermined standard design line direction, as well as an adjusting method for the same, a positioning jig for the same, an assembling method for the same, and an image form apparatus using the same, particularly, a multi-beam source unit wherein an arranged direction of light emitting points of a multi-beam laser diode can be adjusted to a vertical scanning direction of a scanning optical system easily without impairing a required design accuracy, as well as an adjusting method and device for the same, an assembling method for the same, and an image forming apparatus using the same.

For achieving the above oust, according to the present invention, in the first aspect thereof, there is provided a multi-beam source unit including a base member, the base member being provided with a multi-beam laser diode capable of emitting multi-laser beams from a plurality of light emitting points, the multi-beam laser diode having a stem formed with a cutout portion, and also provided with a collimator lens for collimating the multi-laser beams, the multi-beam source unit being designed so as to be set to a scanning optical system on the assumption that the plural light emitting points are arranged in the direction of a predetermined standard design line when they are present on a virtual straight line defined by the said cutout portion, wherein the base member is formed with a mounting seat portion having a through hole to support the multi-beam laser diode rotatably, the stem is formed with an engaging recess for positioning the direction of the virtual straight line to the diction of the standard design line, the mounting seat portion being formed with a positioning groove which cooperates with the engaging recess to align the direction of the virtual straight line with the direction of the standard design line, a tip of jig is inserted through the positioning groove into engagement with the engaging recess, and in this positioned state the multi-beam laser diode is pressed and fixed to the base member by means of a pressing plate which presses a back side of the stem.

According to the above first aspect of the invention, the multi-beam laser diode can be positioned to the base member easily by merely bringing the engaging recess and the positioning grave into engagement with each other with use of jig. Besides, since the multi-beam source unit can be adjusted independently before being mounted into a body portion of an image forming apparatus, it is possible to simplify its mounting work for the image forming apparatus body.

In the second aspect of the present invention there is provided, in combination with the above first aspect, a multi-beam source unit wherein the base member is formed with a fitting cylinder coaxially with the through hole to support the collimator lens and which fisher includes a mounting bracket for supporting the base member rotatably around an optical axis of the scanning optical system, the mounting bracket having a reference plane adapted to be confronted with a reference plane formed in a body portion of an image forming apparatus and also having a fitting hole to be fitted on the fitting cylinder.

According to this second aspect of the invention, since the multi-beam source unit has already been adjusted independently before being mounted into the body portion of the image forming apparatus, the arranged direction of its light emitting points can be made coincident with the direction of the standard design line easy.

In the third aspect of the present invention there is provided, in combination with the above first aspect, a multi-beam source unit wherein the back side of the stem is projected from the mounting seat portion and the pressing plate is provided with a rough positioning lug to be engaged with a projecting portion of the engaging recess projecting from the mounting seat portion.

According to the third aspect of the invention the multi-beam laser diode is roughly positioned for the base member by engagement of the rough positioning lug formed on the pressing plate with the engaging recess, and the positioning can be effected more easily by using a jig after the rough positioning.

In the fourth aspect of the present invention there is provided a method for adjusting a multi-beam source unit including a base member, the base member being provided with a multi-beam laser diode capable of emitting multi-laser beams from a plurality of light emitting points, the multi-beam laser diode having a stem formed with a cutout portion, and also provided with a collimator lens for collimating the multi-laser beams, the multi-beam source unit being designed so as to be set to a scanning optical system on the assumption that the plural light emitting points are arranged in the direction of a predetermined standard design line when they are present on a virtual straight lisle defined by the said cutout portion, wherein the base member is formed with a mounting seat portion having a through hole to support the multi-beam laser diode rotatably, the stem is formed with an engaging recess for positioning the direction of the virtual straight line to the direction of the standard design line, the mounting seat portion being formed with a positioning groove which cooperates with the engaging recess when opposed to the engaging recess with rotation of the stem to align the direction of the virtual straight line with the direction of the standard design line, the multi-beam laser diode, in this positioned state, is pressed and fixed to the base member by means of a prey plate which presses a back side of the stem, the base member is formed with a fitting cylinder coaxially with the through hole to support the collimator lens, and the multi-beam source unit further includes a mounting bracket for supporting the base member rotatably around an optical axis of the scanning optical system, the mount bracket having a reference plane adapted to be confronted with a reference plane formed in a body portion of an image forming apparatus and also having a fitting hole to be fitted on the fitting cylinder, the mounting bracket being mounted to the body portion of the image forming apparatus while thus supporting the base member rotatably, the method comprising the steps of inserting a jig through the positioning groove, bringing a tip of jig into engagement with the engaging recess to position the multi-beam laser diode to the base member, then in this positioned state of the multi-beam laser diode, fixing the multi-beam laser diode to the base member by the pressing plate; thereafter, with the base member supported by the mounting bracket, measuring an actual state of arrangement of the light emitting points relative to the standard design line on the basis of beam spot positions on an image surface corresponding to an image recording surface; and on the basis of the result of the measurement, rotating the base member, centered at the fitting cylinder, around the optical axis of the scanning optical system with respect to the mounting bracket to align the actual arrangement direction of the light emitting points with the direction of the standard design line.

According to this fourth aspect of the invention, since the state of arrangement of the light emitting points relative to the standard design line is measured on the basis of beam spots on an image surface corresponding to the image recording surface and the multi-beam laser diode is rotated for adjustment around the optical axis of the optical system, the arranged direction of the light emitting points can be easily aligned with the direction of the standard design line.

In the fifth as of the present invention there is provided, in combination with the above fourth aspect, a method for adjusting a multi-beam source unit wherein the arranged direction of the light emitting points is adjusted so as to become substantially in parallel with a vertical scanning direction.

According to this fifth as of the invention, since the arranged direction of the light emitting points can be aligned with the vertical scanning direction before mounting the mutt beam source unit to the body portion of the image forming apparatus, it is possible to dispense with such an operation as adjusting the beam spot pitch in the vertical scanning direction after mounting the multi-beam source unit to the body portion of the image arming apparatus and it is not necessary to adopt a complicated construction such that for correcting write start positions displaced in the horizontal scanning direction due to the beam spot pitch adjustment, sensors for detecting laser beam scan positions are provided for laser beams reactively on the image forming apparatus body side and the write start position is controlled for each laser beam, nor is it necessary to adopt a complicated construction such that a tune lag of each laser beam in the horizontal scanning direction is measured and a control is made for driving each laser beam with use of a delay circuit. Thus, it is able to reduce the number of components used, shorten the assembling time required for mounting to the body portion of the image forming apparatus, and attain the reduction of cost. It is also possible to attain the simplification of control using software.

In the sixth aspect of the present invention there is provided a jig for positioning a multi-beam laser diode in unitizing a multi-beam source unit including a base member, the base member being provided with a multi-beam laser diode capable of emitting multi-laser beams from a plurality of light emitting points, the multi-beam laser diode having a stem armed with a cutout portion, and also provided with a collimator lens or collimating the multi-laser beams, the multi-beam source unit being designed so as to be set to a scanning optical system on the assumption that the plural light emitting points are arranged in the direction of a predetermined standard design line when they are present on a virtual straight line defied by the said cutout portion, wherein the base member is formed with a mounting seat portion having a through hole to support the multi-beam laser diode rotatably, the stem is formed with an engaging recess for positioning the direction of the virtual straight line to the direction of the standard design line, the mounting seat portion being armed with a positioning groove which cooperates with the engaging recess to align the direction of the virtual straight line with the direction of the standard den line, a tip of jig is inserted through the positioning groove into engagement with the engaging and in this positioned sate the multi-beam laser diode is pressed and fixed to the base member by means of a pressing plate which presses a back side of the stem, the jig being provided with a position tip portion for tight engagement with the engaging recess and also provided with a guide portion to be guided by the portioning groove.

According to this sixth aspect of the invention, once the jig is inserted through the positioning groove and its positioning tip portion is brought into tight engagement with the engaging recess, the multi-beam laser diode is positioned to the base member, and all that is required after the positioning is merely pulling out the jig. Thus, the jig can be manufactured inexpensively and can be re-utilized In the seventh aspect of the present invention there is provided, in combination with the above sixth aspect, a jig wherein the positioning tip portion of the jig is tapered toward the tip thereof.

In the seventh aspect of the present invention there is provided, in combination with the above sixth aspect, a jig wherein as long as the positioning groove and the engaging recess are in a roughly positioned state, the positioning is ensured by a mere insertion of the jig.

In the eighth aspect of the present invention there is provided a method for assembling a multi-beam sore unit, comprising a positioning step of positioning the multi-beam laser diode described in the fourth aspect with use of a jig at the time of press-fitting the multi-beam laser diode into the mounting seat portion described in the fourth aspect, a mounting step of mounting and fixing the multi-beam laser diode in the positioned state thereof to the base member described in the fourth aspect unrotatably by the pressing plate described in the fourth aspect, a measuring step of measuring the state of arrangement of the light emitting point described in the fourth aspect by an adjusting optics, and a rotation adjusting step of adjusting the rotation of the multi-beam source unit described in the fourth aspect on the basis of the measurement of the light emitting points arranged state so that the arranged direction of the light emitting points are arranged with the direction of the standard design line described in the fourth aspect.

According to this eighth aspect of the invention, both positioning of the multi-beam laser diode and the base member and adjustment of the beam spots arranged direction the multi-beam source unit can be done simultaneously in the multi-beam source unit assembling process and thus the multi-beam source unit assembling work can be done efficiently.

BRIEF DESCRIPTION OF THE DRAWINGS

FIG. 4 is an explanatory diagram for explaining an example of controlling write start positions on the image recording surface;

FIG. 28 is a sectional view of a partially omitted principal portion of the multi-beam source unit according to the second embodiment, showing an example of an adjusting method or the same unit.

DETAILED DESCRIPTION OF PREFERRED EMBODIMENTS

[Multi-beam source unit and method or adjusting the same according to the first embodiment]

Figure 1:
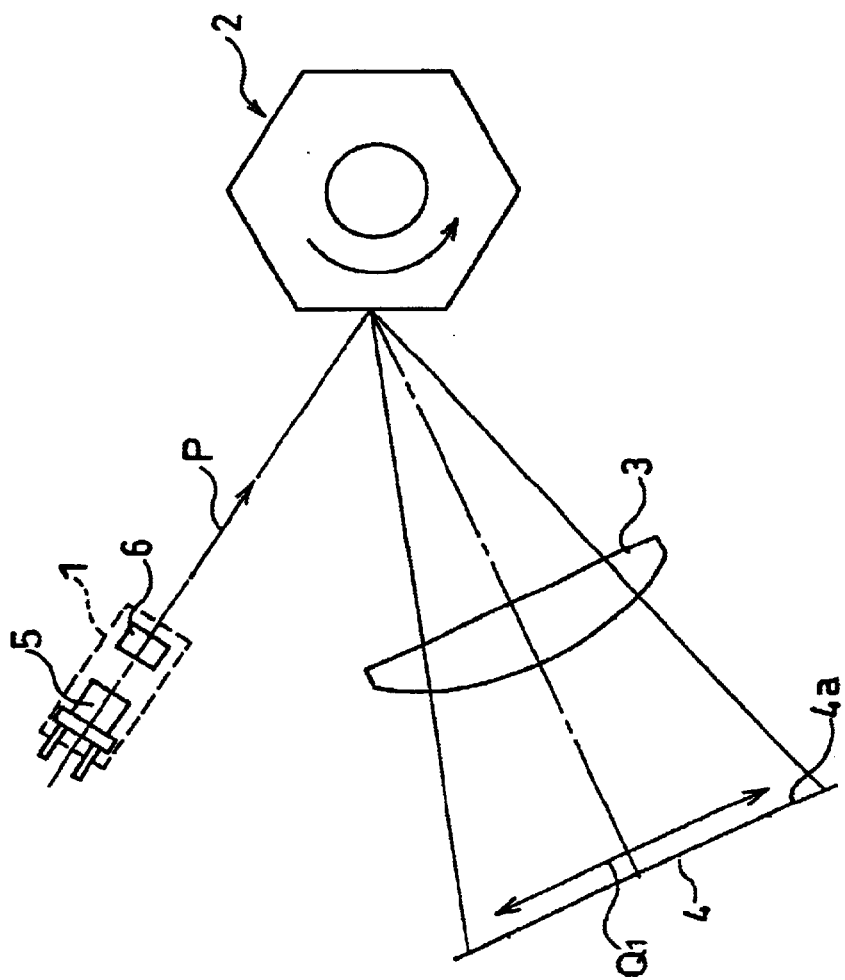
FIG. 1 is a schematic diagram swing a schematic construction of a scanning optical system.
Figure 2:
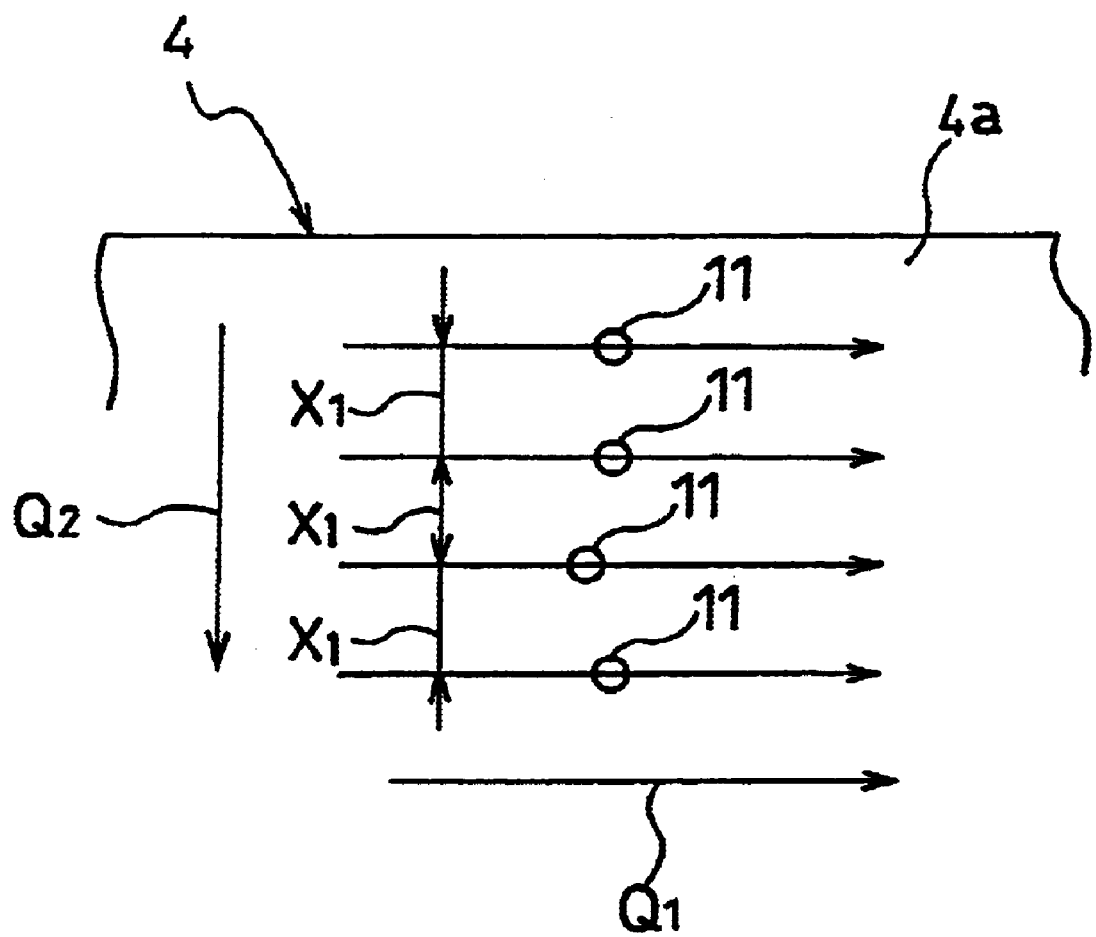
FIG. 2 is a schematic diagram showing an arranged state of beam spots on an image recording surface.
Figure 3:
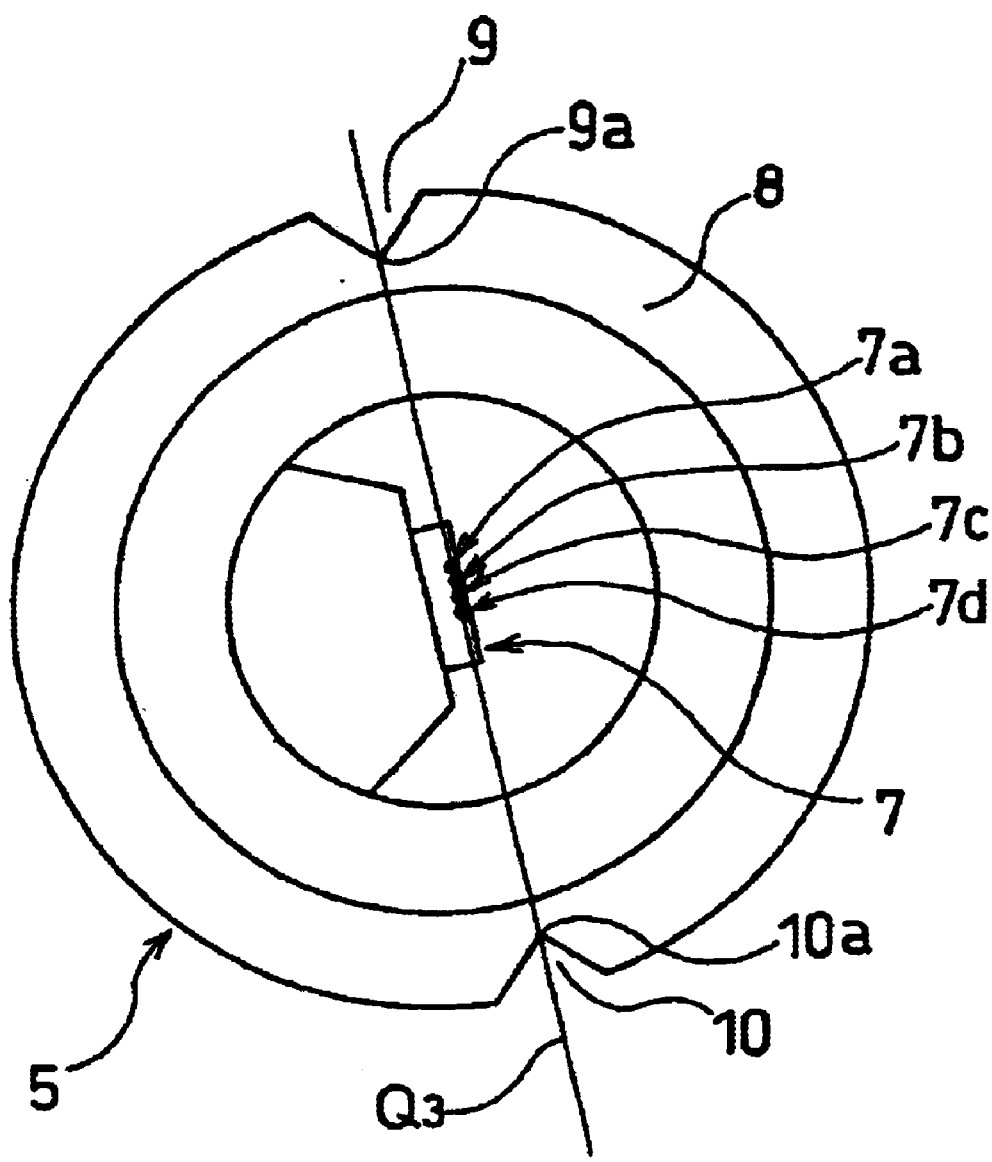
FIG. 3 is a schematic diagram for explaining an arranged state of light emitting points of a multi-beam laser diode.
Figure 5A:
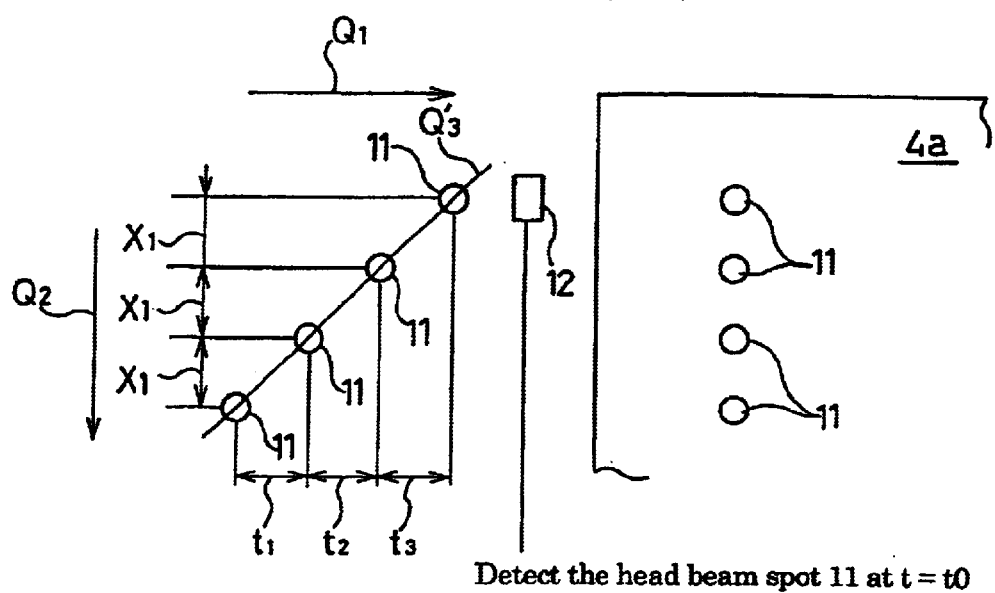
FIG. 5 is an explanatory diagram for explaining another example of controlling write start positions on the recording surface, in which (a) illustrates a relation between an arranged direction of beam spots and write start positions and (b) is a timing diagram for explaining light emission timings of the light emitting points in the multi-beam diode.
Figure 5B:
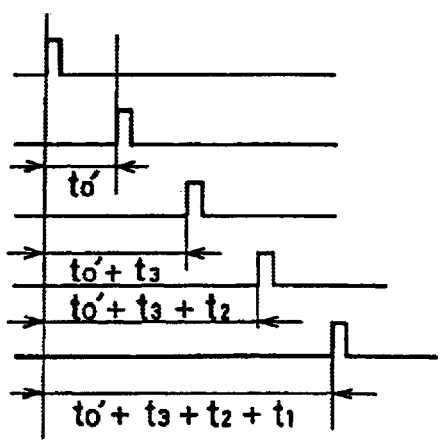
Figure 6A:
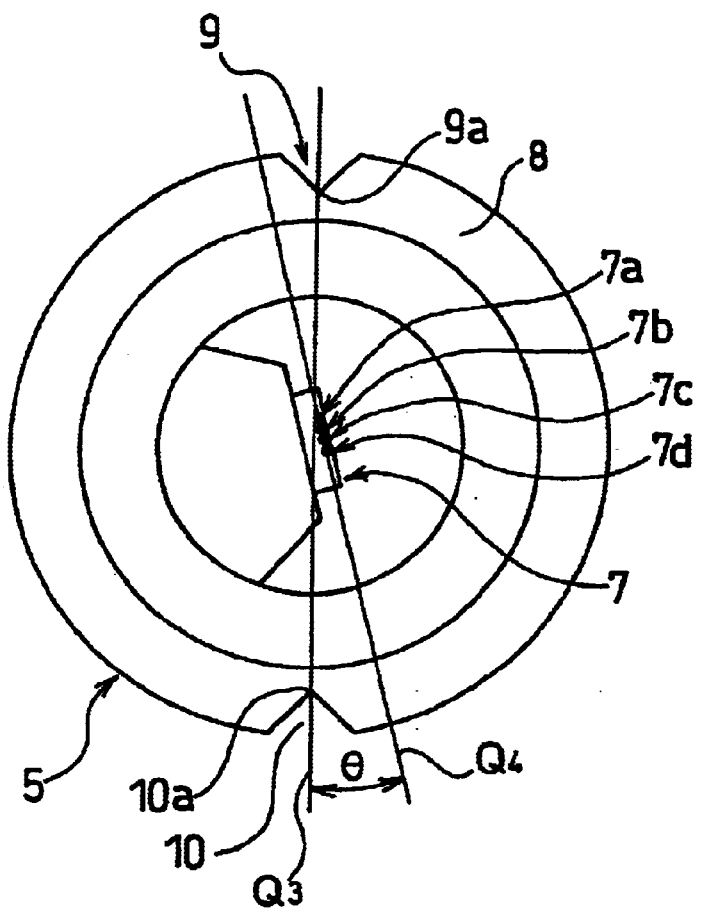
FIG. 6(A) is a diagram for explaining an inclination between an arranged direction of the light emitting points in the multi-beam laser diode and the direction of a standard design line.
Figure 6B:
FIG. 6(B) is an explanatory diagram showing an ideally arranged state of beam spots.
Figure 6C:
FIG. 6(C) is an explanatory diagram showing a deviated state of beam spots.
Figure 7:
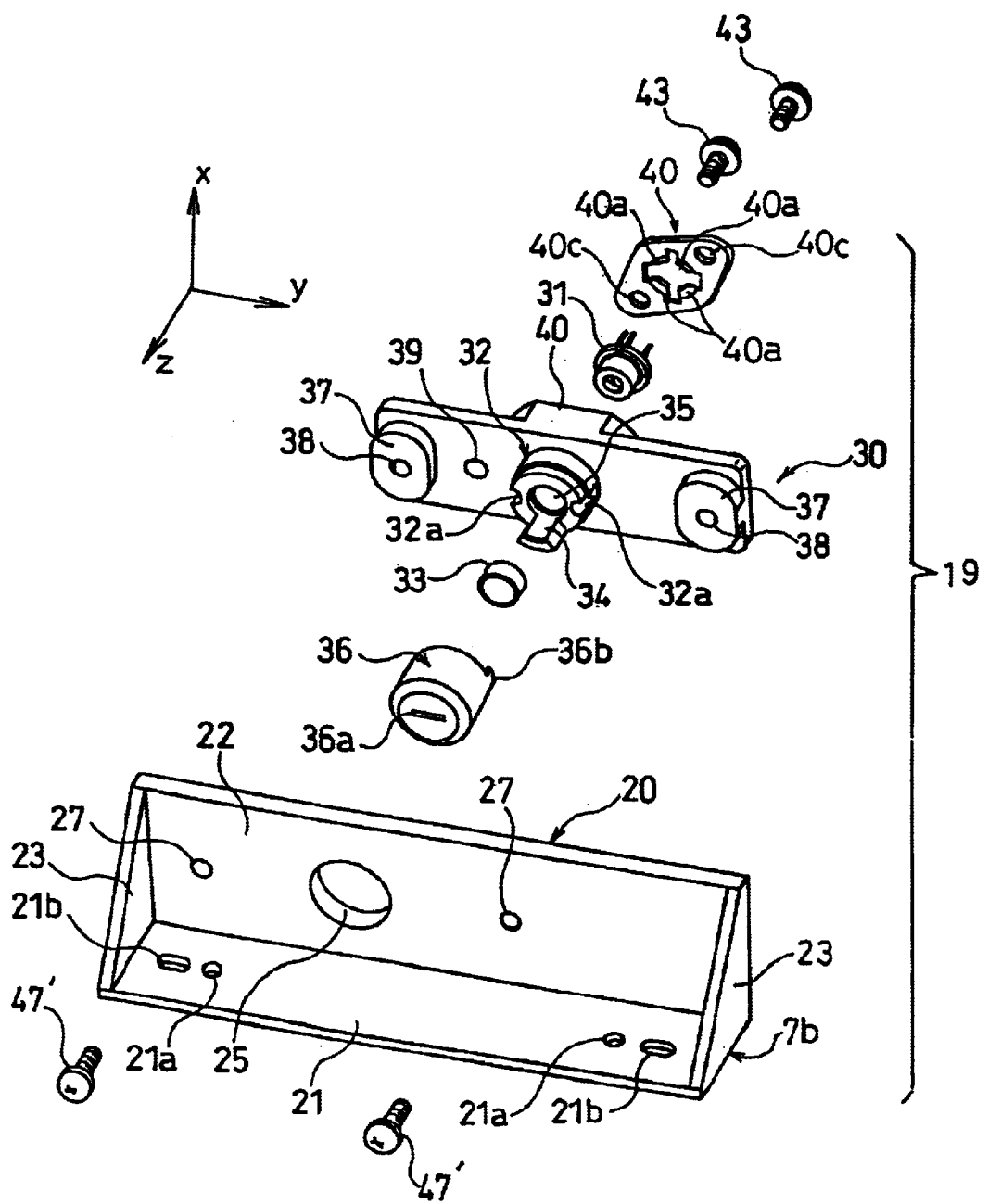
FIG. 7 is an exploded perspective view of a multi-beam source unit according to the first embodiment of the present invention.

FIG. 7 is an exploded perspective view of a multi-beam source unit 19 embodying the present invention. In the same figure, the reference numeral 20 denotes a mounting bracket. The mounting bracket 20 has a bottom wall portion 21, an upright wall portion 22, and a pair of side wall portions 23. In the bottom wall portion 21 are formed a pair of positioning holes 21a and a pair of screw inserting holes 21b.

Figure 8A:
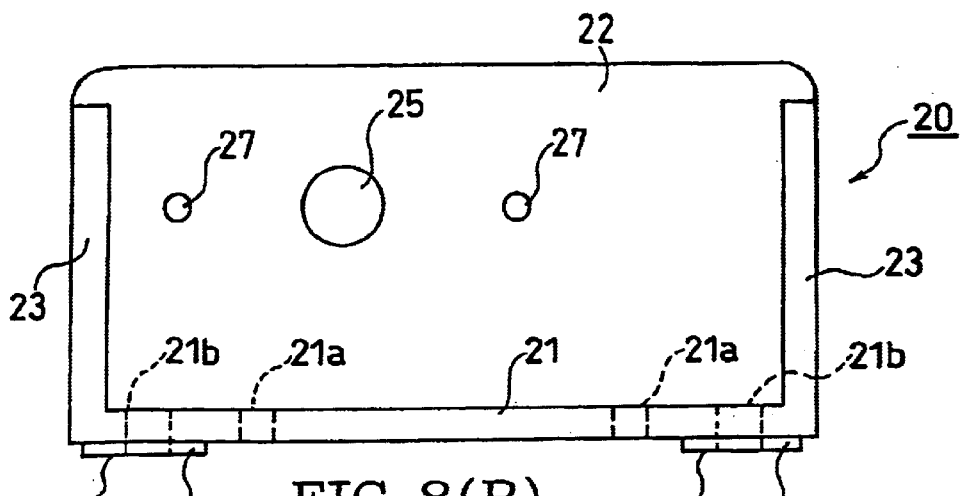
FIG. 8(A) is a front view of a mounting bracket shown in FIG. 7.

On the underside of the bottom wall portion 21 are formed positioning reference portions 24, as shown in FIG. 8(A). The positioning reference portions 24 are to be confronted with positioning reference portions of a housing serving as a body portion of an image forming apparatus which will be described later.

Figure 8B:
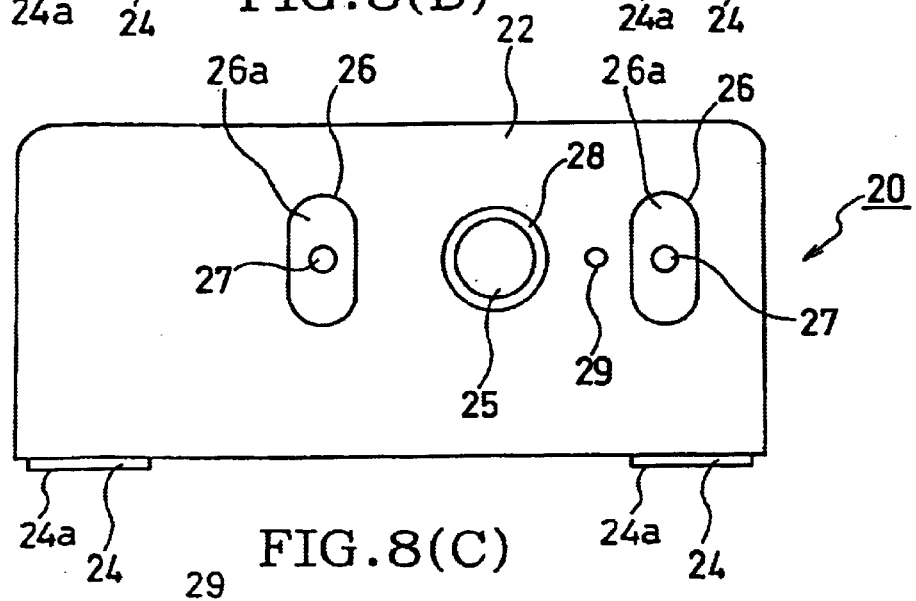
FIG. 8(B) is a rear view thereof.
Figure 8C:
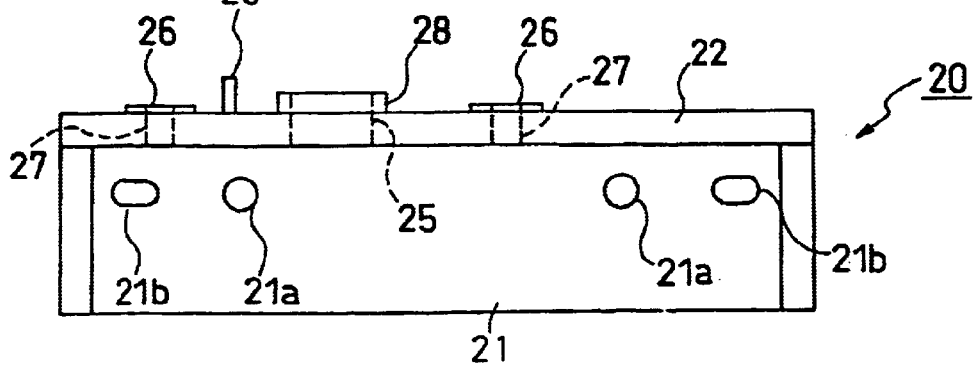
FIG. 8(C) is a plan view thereof.

In the upright wall 22 is formed a circular through hole 25 and on the back side of the upright wall 22 are formed a pair of positioning reference portions 26 on both sides of the through hole 25, as shown in FIGS. 8(B) and 8(C). Reference planes, which define a vertical scanning direction, of the positioning reference portions 26 an formed substantially perpendicularly to reference planes, which define a horizontal scanning direction, of the positioning reference portions 24. In the paired positioning reference portions 26 are formed screw inserting holes 27, respectively.

Further, on the back side of the upright wall portion 22 is formed a circular fitting cylinder 28 concentrically with the circular through hole 25 and a rotation restricting pin 29 is projected between the circular fitting cylinder 28 and one positioning reference portion 26.

Figure 9:
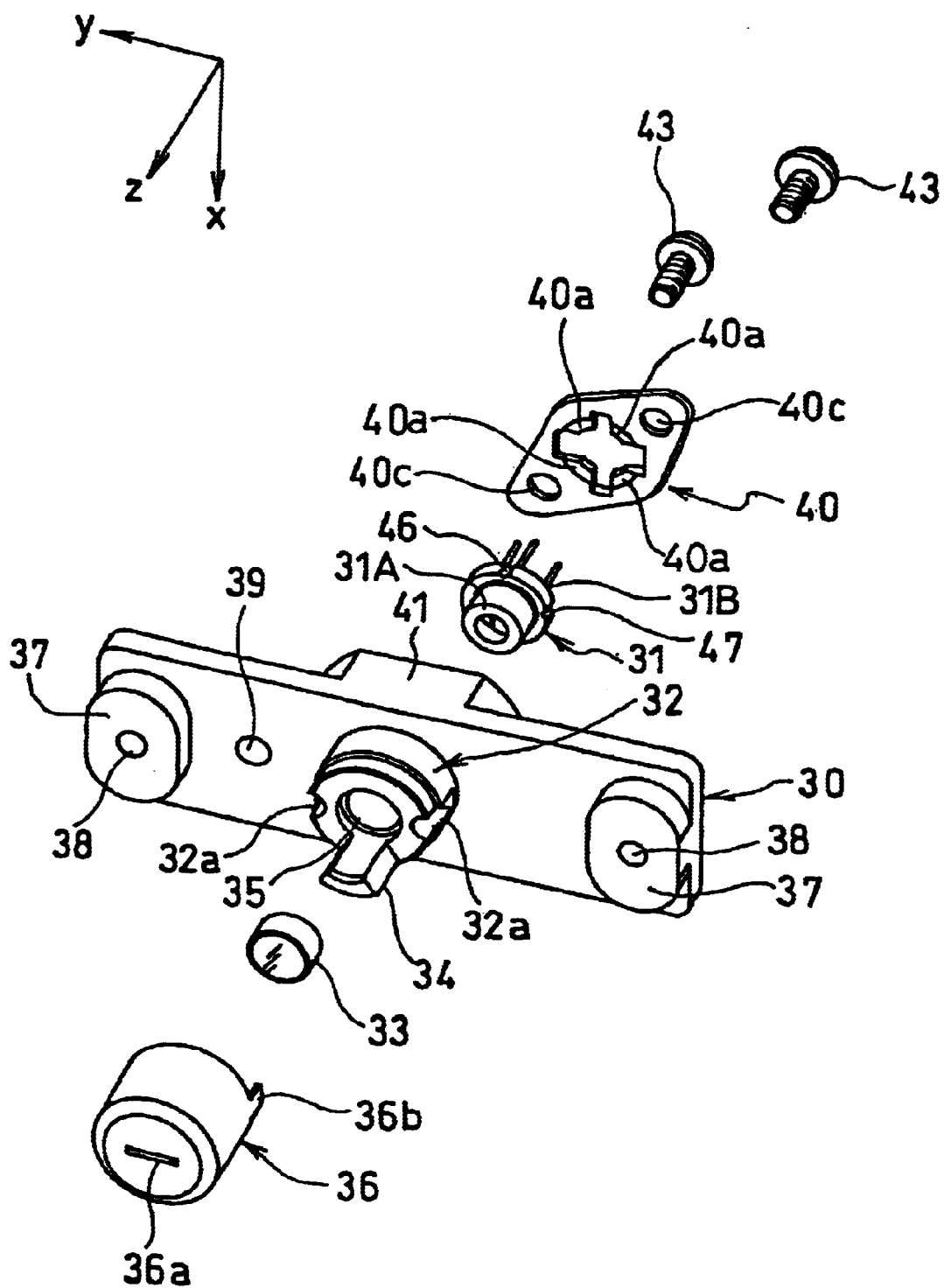
FIG. 9 is an enlarged view of a principal portion of the multi-beam source unit shown in FIG. 7 as seen from the front side thereof.

A base member 30 is attached to the back side of the upright wall portion 22. The base member 30 holds a multi-beam laser diode 31. As shown on a larger scale in FIG. 9, the base member 30 is provided on its front side with a circular fitting cylinder 32 to be fitted in the fitting cylinder 28.

An inside diameter of the fitting cylinder 28 and the diameter of the circular through hole 25 are equal to each other and an outside diameter of the fitting cylinder 32 is formed a little smaller than the diameter of the circular through hole 25 to the extent that the fitting cylinder 32 can rotate around the circular through hole.

The fitting cylinder 32 is formed with an arcuate support portion 34 for supporting a collimator lens 33. The collimator lens 33 functions to collimate multi-laser beams emitted from the multi-beam laser diode 31. As to the details of mounting the collimator lens 33 to the circular support portion 34, it will be described later.

The fitting cylinder 32 has a central opening 35. Multi-laser beams are emitted toward the collimator lens 33 through the opening 35. An aperture member 36 for shaping the multi-laser beams is attached to the fitting cylinder 32. A pair of cutout portions 32a are formed in the fitting cylinder 32 on both sides of the opening 35. The aperture member 36 is formed with a slit 36a which extends long horizontally and a pair of engaging pieces 36b for engagement with the paired cutout portions 32a.

A pair of positioning reference portions 37 are formed at both side positions of the base member 30 which positions correspond to the positions of the paired positioning reference portions 26, with tapped holes 38 being formed in the positioning reference portions 37 respectively. Between one positioning reference portion 37 and the fitting cylinder 32 is formed a loose insertion hole 39 for loose insertion therein of the rotation restricting pin 29.

Figure 10:
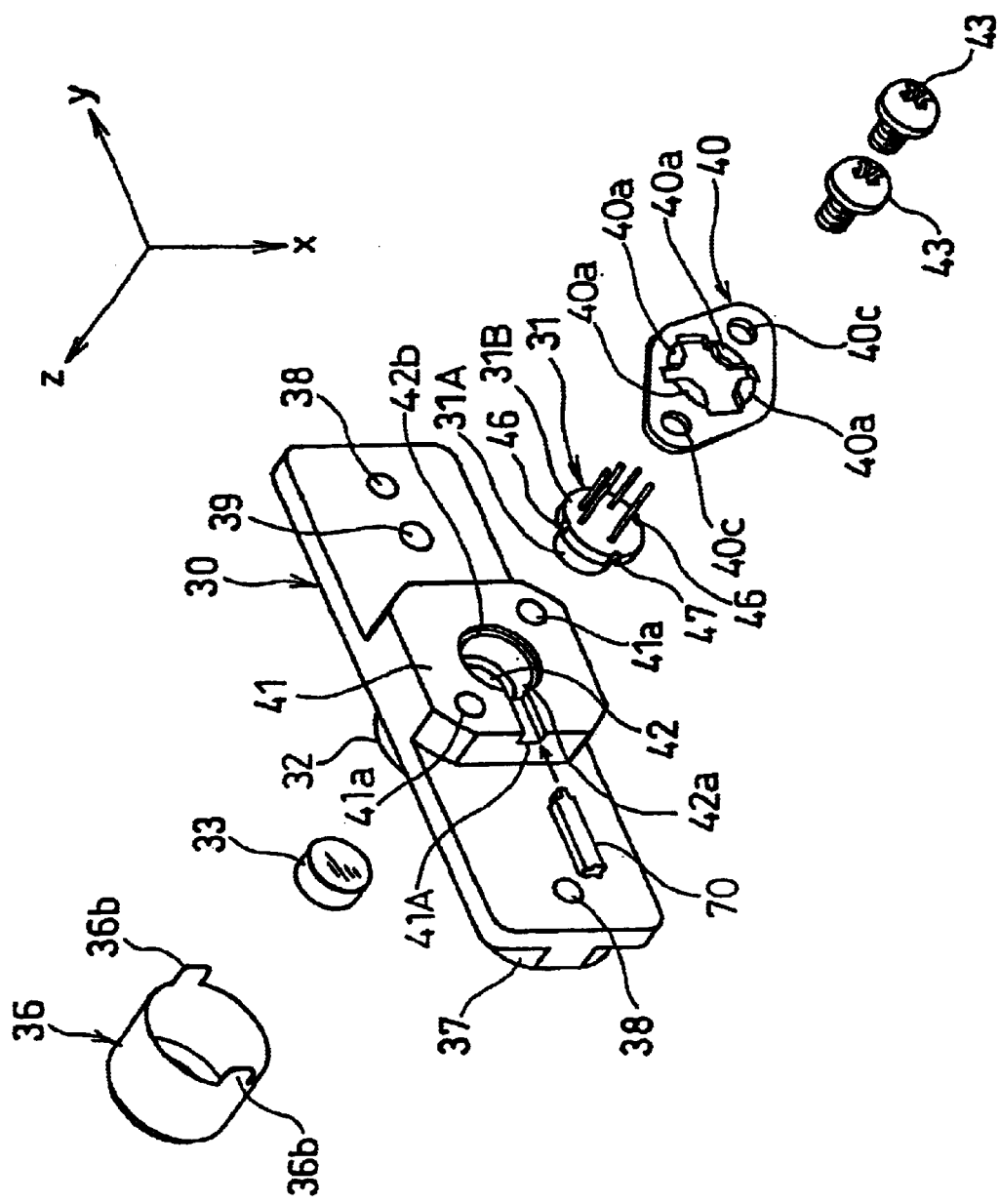
FIG. 10 is an enlarged view of the principal portion of the multi-beam source unit as seen from the back side thereof.

On the back side of the base member 30, as shown on larger scale in FIG. 10, there is formed a pressing plate mounting portion 41 which serves as a mounting seat portion for mounting a pressing plate 40. The pressing plate 40 is centrally provided with four pressing spring pieces 40a and is provided with a pair of through holes 40c.

In the pressing plate mounting portion 41 is formed a fitting hole 42 as a through hole concentric with the opening 35. The fitting hole 42 is formed with a mounting reference hole 42a for a stem 31B and an abutting reference plane 42b for the stem. In the pressing plate mounting portion 41 is formed a positioning groove 41A which is in communication with the fitting hole 42. The positioning reference hole 41A is used as one of positioning references at the time of fixing the multi-beam laser diode 31 to the base member 30.

The mounting reference hole 42a is formed a little larger in diameter than the stem 31B and the depth thereof is set to the extent that when the stem 31B is pushed against the abutting reference plane 42b, the back of the stem projects from the back of the pressing plate mounting portion 41.

A cylindrical body portion 31A of the multi-beam laser diode 31 is fitted in the fitting hole 42. In the pressing plate mounting portion 41 are formed a pair of tapped holes 41a on both sides of the fitting hole 42 correspondingly to the through holes 40c formed in the pressing plate 40. The diameter of each through hole 40c is a little larger than the diameter of a shaft portion of a screw 43 with spring washer which will be described later.

The pressing plate 40 is pressed and fixed to the preying plate mounting portion 41 by fitting the cylindrical body portion 31A of the multi-beam laser diode 31 into the fitting hole 42, then putting the pressing spring pieces 40a on the back of the stem 31B of the multi-beam laser diode 31, and further by bringing screws 43 into threaded engagement with the tapped holes 41a respectively.

[Construction of the multi-beam laser diode 31]

Figure 12:
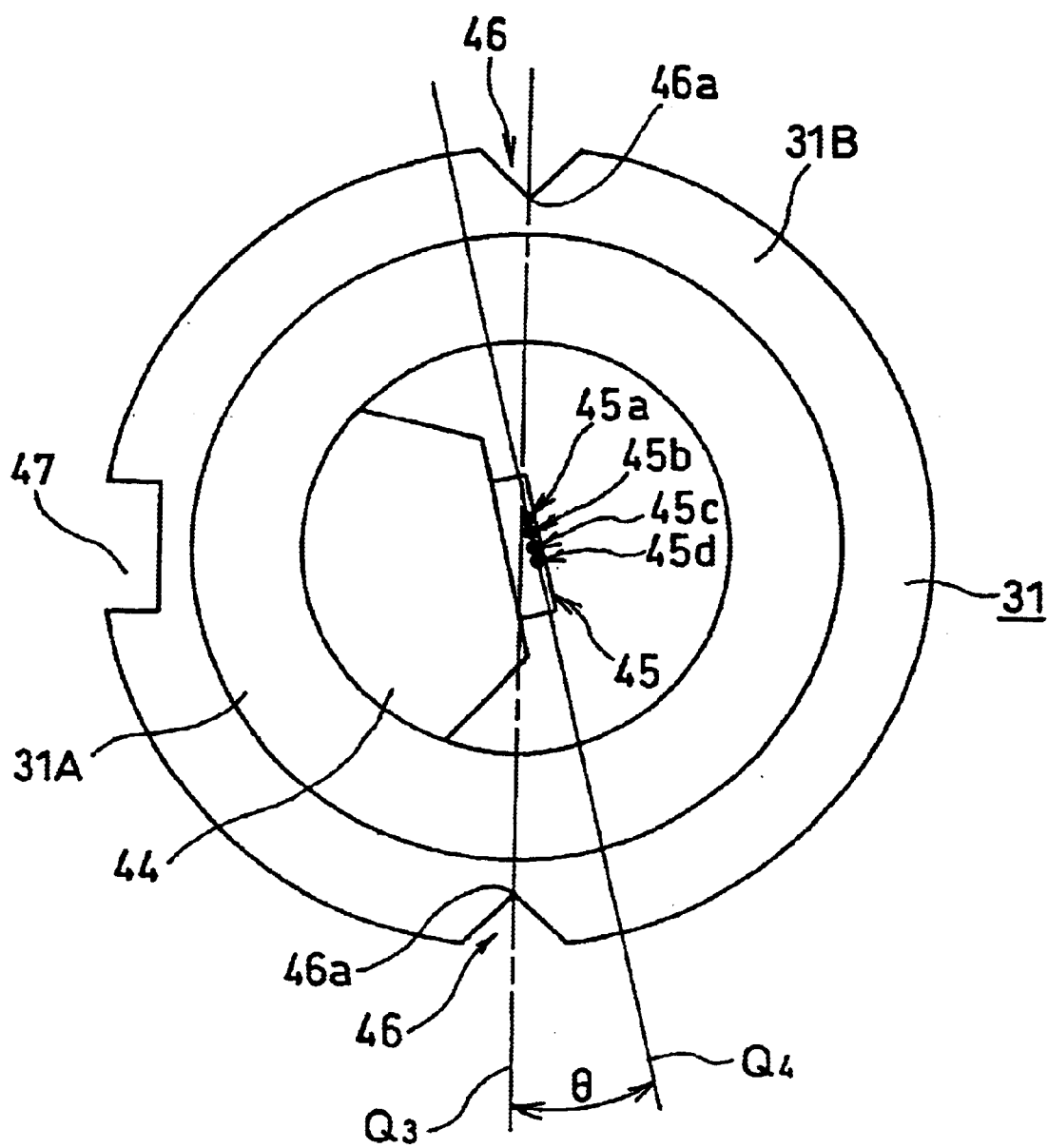
FIG. 12 is an enlarged plan view of a multi-beam laser diode shown in FIG. 7.

In the interior of the cylindrical body portion 31A of the multi-beam laser diode 31 is armed a pedestal 44, which is provided with a rectangular light emitting chip portion (light emitting portion) 45, as shown in FIG. 12. In the illustrated construction, four light emitting points 45a–45d are provided in the light emitting chip portion 45. The stem 31B is formed with a pair of acute-angled cutout portions 46. The cylindrical body portion 31A is substantially concentric with the center in the arranged direction of the light emitting points 45a–45d.

The light emitting points 45a–45d are to be arranged spacedly on a virtual straight line Q3, but due to errors in the manufacture of the multi-beam laser diode 31 an arranged direction Q4 joining the light emitting points 45a–45d is inclined with respect to the virtual line Q3. The virtual line Q3 is obtained by joining acute points 46a of the paired cutout portions 46. The stem 31B is farmed with a cutout portion 47 as an engaging recess at a position orthogonal to the virtual straight line Q3.

Figure 13:
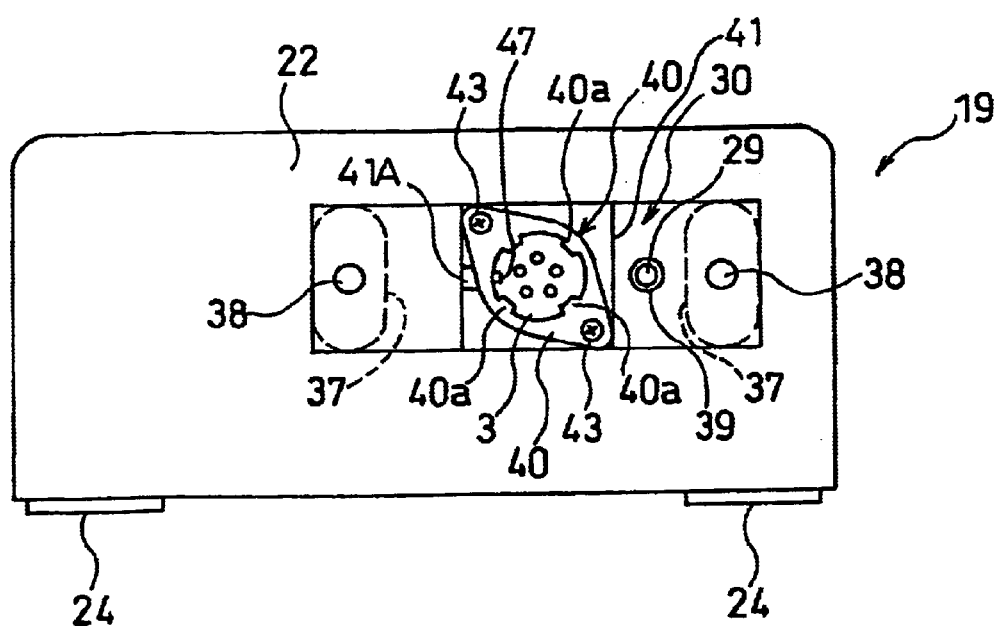
FIG. 13 is a rear view of the multi-beam source unit is shown FIG. 7.
Figure 14A:
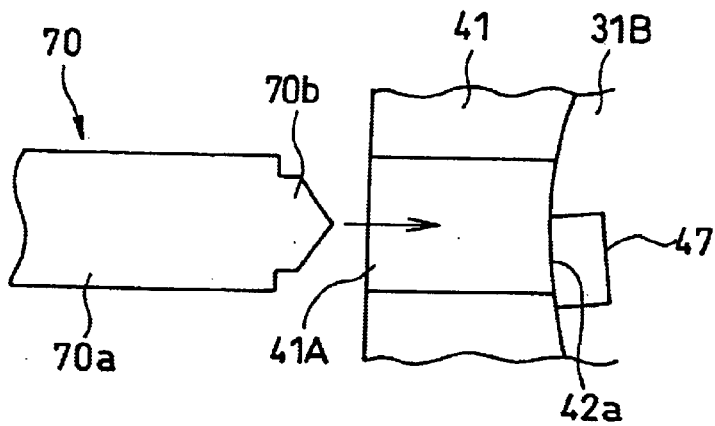
FIG. 14(A) is an explanatory diagram of a principal portion before positioning in which a positioning groove and a cutout portion are displaced from each other.
Figure 14B:
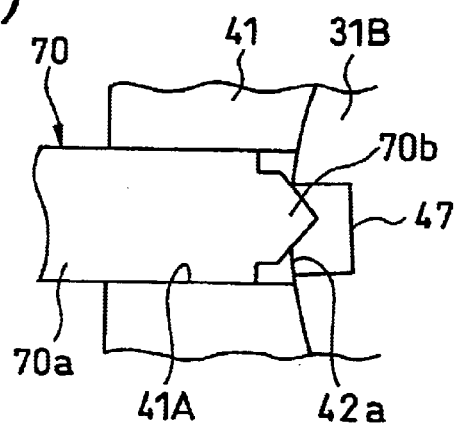
FIG. 14(B) is an explanatory diagram of the principal portion during positioning in which the positioning groove and the cutout portion are displaced from each other.
Figure 14C:
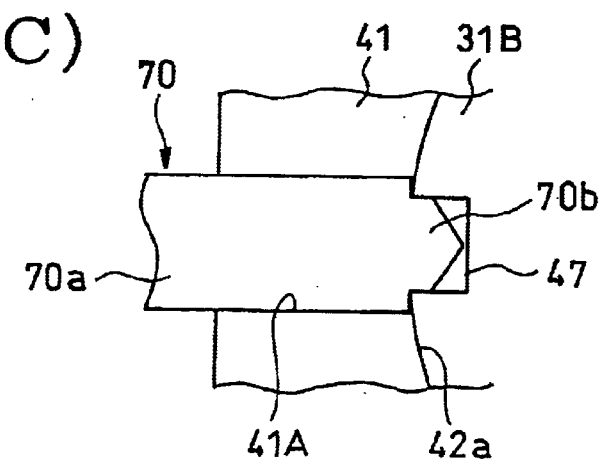
FIG. 14(C) is an explanatory diagram of the principal portion in which the positioning groove and the cutout portion are aligned with each other.

The cutout portion 47 is used as the other positioning reference at the time of fixing the multi-beam laser diode 31 to the base member 30. As shown in FIG. 13, the multi-beam laser diode 31 is positioned relative to the base member 30 by align the cutout portion 47 and the positioning groove 41A with each other, and is fixed to the base member 30 with screws 43. In this case, a jig 70 is used for alignment of the cutout portion 47 with the positioning groove 41A. As shown in FIGS. 14(A) to 14(C), the jig 70 is provided with a guide portion 70a to be guided by the positioning groove 41A and a positioning tip portion 70b, the positioning tip portion 70b being formed at the tip of the guide portion 70a and brought into close contact with the cutout portion 47. The positioning tip portion 70b is tapered towed the tip thereof.

Therefore, even if the cutout portion 47 is displaced from the positioning groove 41A, as shown in FIG. 14(A), if the displacement is to such an extent as permits tip of the positioning tip portion 70b to enter the cutout portion 47, as shown in FIG. 14(B), the positioning tip portion 70b should be further advanced into the cutout portion 47 while allowing the guide portion 70a to be guided by the positioning groove 41A. By so doing, the cutout portion 47 is pushed by the tip shape of the positioning tip portion 70b and the stem 31B turns within the mounting reference hole 42a, so that the positioning groove 41A and the cutout portion 47 become aligned with each other, as shown in FIG. 14(C).

Figure 11:
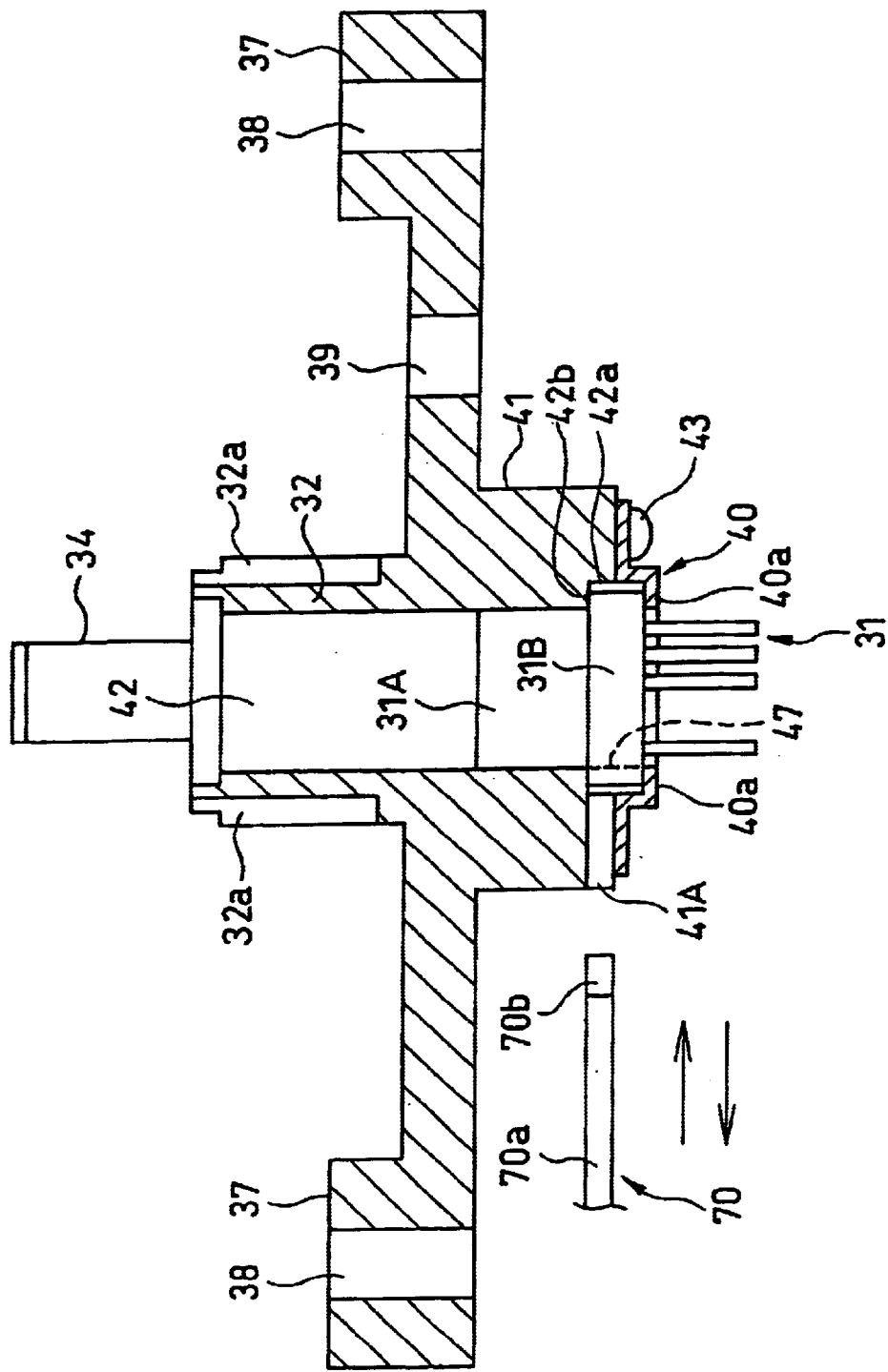
FIG. 11 is a sectional view of a partially omitted principal portion of the multi-beam source unit shown in FIG. 7.

The insertion and extraction of the jig 70 are performed in a pressed state of the back of the stem 31B toward the pressing plate mounting portion 41 (toward the mounting reference hole 42a) by the pressing plate 40, as shown in FIG. 11. In this case, if the pressing plate 40 is temporarily fixed to the pressing plate mounting portion 41, the rotation for positioning of the stem 31B can be done more easily and it is possible to prevent an accidental rotation of the stem 31B after extraction of the jig 70 and after positioning.

Figure 15:
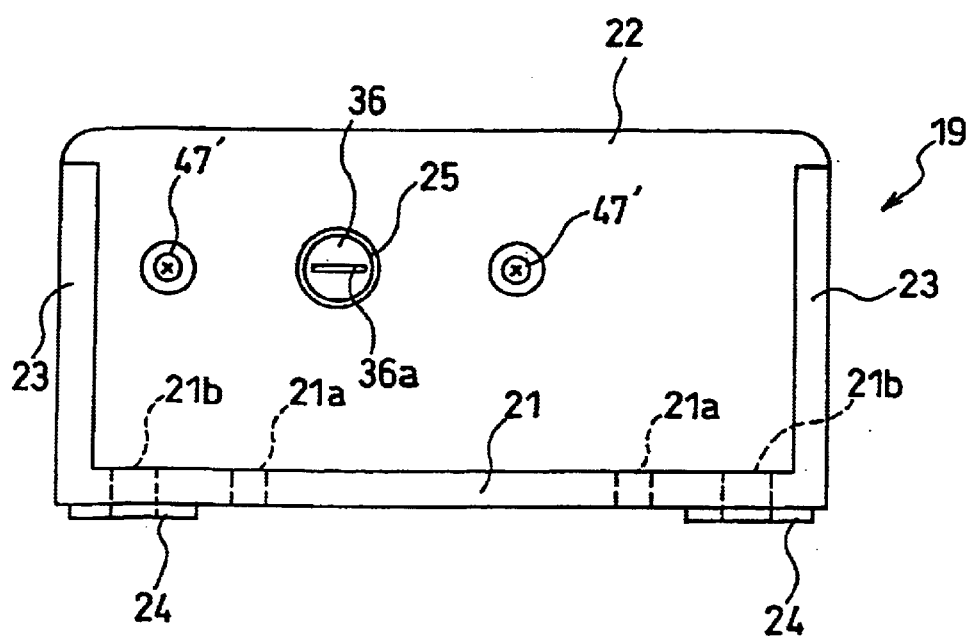
FIG. 15 is a front view of the multi-beam source unit shown in FIG. 7.

As shown in FIG. 15, the base member 30 is temporarily fixed to the upright wall portion 22 by means of screws 47 with spring washer, whereby the multi-beam source unit 19 is assembled.

[Adjusting the angle of the multi-beam source unit]

Figure 16:
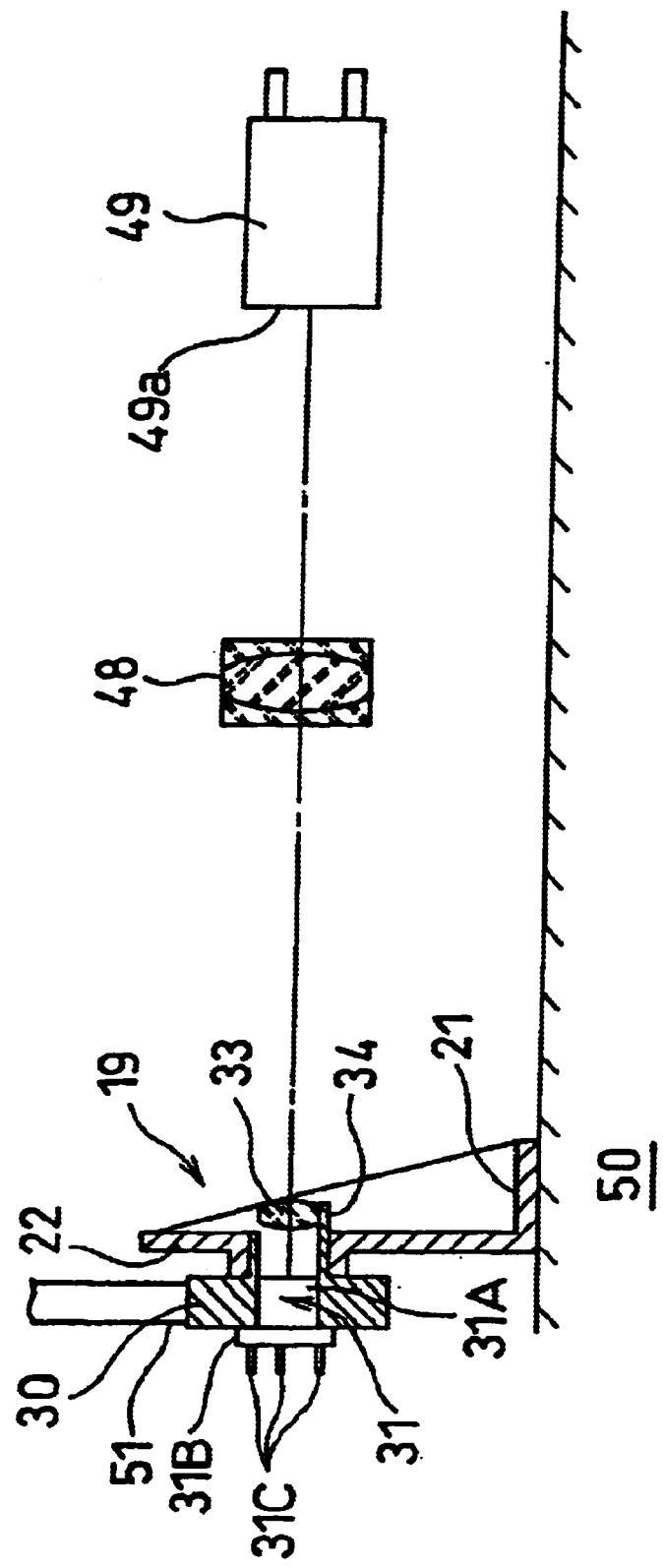
FIG. 16 is a schematic diagram of an adjusting device for the multi-beam source unit shown in FIG. 7.

FIG. 16 is a schematic diagram of an adjusting device for use in the multi-beam laser diode adjusting method. The adjusting device has a condenser lens (focusing lens) 48 and an pickup device 49. The adjusting device is further provided with a reference mounting portion 50. The multi-beam source unit 19 is set to the adjusting device in a state in which the reference planes of the positioning reference portions 24 are brought face to face with a reference plane of the reference mounting portion 50.

With the multi-beam source unit 19 set to the adjusting device, the collimator lens 33 is placed on the arcuate support portion 34 with a photo-curing adhesive (ultraviolet-curing adhesive) applied thereto. The collimator lens 33 is held by a collimator lens holding arm (not shown) and is disposed in a predetermined initial design position on the arcuate support portion 34. The collimator lens holding arm 3 is provided on a three-axis movable stage capable of being controlled independently in three-axis directions.

Figure 17:
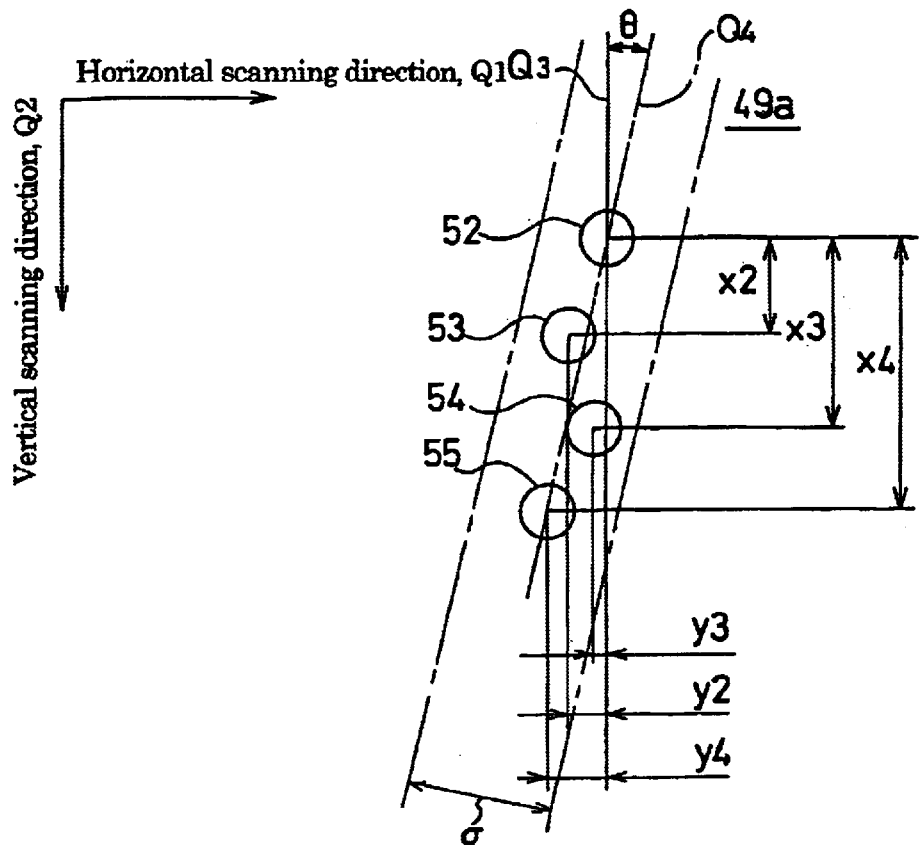
FIG. 17 is an explanatory diagram showing an arranged state of beam spots adjusted on an image pickup surface shown in FIG. 7.

A tip 51 of a micrometer is brought into contact with an upper end face of the base member 30 at a position move outside than the position where the rotation restricting pin 29 is present. In this state, a drive voltage is applied to terminals 31c of the multi-beam laser diode 31 simultaneously, whereby beams are emitted from the light emitting points 45a–45d are activated and beam spots 52–55 corresponding to the light emitting points 45a–45d are formed on an image pickup surface 49a which corresponds to an image recording surface 4a, as shown in FIG. 17.

Assuming that there is no mounting error in design, the virtual straight line Q3 coincides with the vertical scanning direction Q2, namely, the standard design line. The light emitting points 45a–45d vary due to manufacturing errors and it is presumed that their positions in the horizontal scanning direction Q1 and intervals in the vertical scanning direction Q2 on the pickup surface 49 are not constant. Thus, the arranged direction Q4 as arranged state of the beam spots 52–55 is not always existent.

In this embodiment, therefore, a straight line obtained by joining two light emitting points 45a and 45d, which are remotest from each other out of the four light emitting points 45a–45d, (by joining the beam spots 52 and 55), is regarded as being the arranged direction Q4 and the angle θ of the arranged direction Q4 relative to the virtual straight line Q3 is measured.

Given that, in the vertical scanning direction, the spacing between the beam spots 52 and 53 is ×2, the spacing between the beam spots 52 and 54 is ×3, and the spacing between the beam spots 52 and 55 is ×4, while, in the horizontal scanning direction, the spacing between the beam spots 52 and 53 is y2, the spacing between the beam spots 52 and 54 is y3, and the spacing between the beam spots 52 and 55 is y4, the angle θ is determined in accordance with the following equation:

$$\theta = \tan^{-1}(y4/x4)$$

Instead of regarding the straight line obtained by joining the two remotest light emitting points 45a and 45d out of the light emitting points 45a–45d (the straight line obtained by joining the beam spots 52 and 55) as the arranged direction Q4, there may be adopted a method involving obtaining an approximate straight line by the method of least squares, using the approximate straight line thus obtained as the arranged direction Q4, and determining the angle θ of the arranged direction Q4 relative to the virtual straight line Q3.

$$\theta = (\Sigma(x'ixy'i) - \Sigma(x'ixy'i)N)/(\Sigma x'i^2 - (\Sigma x'i)^2)/N$$

where N stands or the number of light emitting points (here, N=4), x' i and y' i stand for positions in x and y directions, respectively, of each light emitting point.

Next, in accordance with the angle θ thus obtained, the micrometer is operated manually to turn the base member 30 by the angle θ so that the arranged direction Q4 becomes aligned with the vertical scanning direction Q2.

Then, the collimator lens 33 is adjusted its positions in x and y directions so as to align the optical axis of the collimator lens 33 with the center of rotation and at the same time the position in the z direction (the position in the optical axis direction) of the collimator lens 33 is adjusted. This adjustment in the optical axis direction of the collimator lens 33 is conducted for making the light emitting points 45a–45d coincident with a focal position (focal plane) of the collimator lens 33 to enhance the collimatability. These positional adjustments are performed using the foregoing three-axis movable stage.

The positional adjustments of the collimator lens 33 are performed for each of the light emitting points 45a–45e to determine an optimal position and a mean value of optimal positions thus obtained is used as a representative characteristic. The collimator lens 33 is positioned at the mean value.

After the positional adjustments of the collimator lens 33, ultraviolet light (UV light) is radiated to the collimator lens by means of an ultraviolet light irradiator, allowing an ultraviolet-curing resin to be cured, and the collimator lens 33 is fixed by bonding to the arcuate support portion 34. Next, the collimator lens 33 is released from the collimator lens holding arm and a check is made to see whether the arranged states of the beam spots 52–55, i.e., the spacings y2–y4 in the horizontal scanning direction of the beam spots 52–55, fall under a specification σ or not.

If the spacings y2–y4 in the horizontal scanning direction of the beam spots 52–55 are outside the specification σ, the angle of the base member 30 is again adjusted and the collimator lens 33 is adjusted its position. After the end of this adjusting work, the screws 47 with sprig washer are further tightened to fix the base member 30 to the mounting bracket 20 unrotatably. Then, each laser beam is measured for optical characteristics and arranged state and the multi-beam laser diode 31 is turned OFF to terminate the adjusting work.

Figure 18:
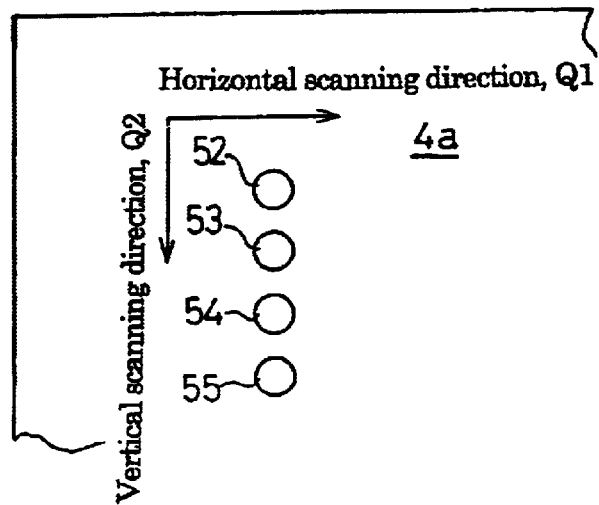
FIG. 18 is an explanatory diagram showing an arranged state of beam spots adjusted by the adjusting device shown in FIG. 16.

As a result of the adjusting work, as shown in FIG. 18, the beam spots 52–55 are substantially aligned in the vertical scanning direction Q2, that is, their write start positions on the image recording surface 4a are aligned. Since the write start positions of the beam spots 52–55 are thus aligned, it is possible to simplify the configurations of a control circuit and a drive circuit in the body portion of the image forming apparatus.

Thus, in the multi-beam source unit assembly adjusting process there are performed measuring an arranged state of the light emitting points of the multi-beam laser diode 31, rotating the multi-beam laser diode 31 so as to align the light emitting points arranged direction with the standard design line direction on the basis of the measurement of the light emitting points arranged state, and adjusting the position of the collimator lens 33 after the rotational adjustment of the multi-beam laser diode 31 to establish the position of the collimator lens relative to the multi-beam laser diode 31. The aperture member 36 is mounted after this adjustment.

Although the arranged direction Q4 as the arranged state is here evaluated, there may be adopted a method involving rotating the base member 30 by predetermined angles to determine spacings (deviations) in the horizontal scanning direction Q1, regarding the angle θ as the arranged direction Q4 of the light emitting points 45a–45e at which angle the maximum deviation out of the deviations y2, y3, and y4 becomes minimum, and rotating the multi-beam laser diode 31 in that direction to align the write start positions of the beam spots 52–55.

[Schematic construction of the body portion of the image forming apparatus]

Figure 19:
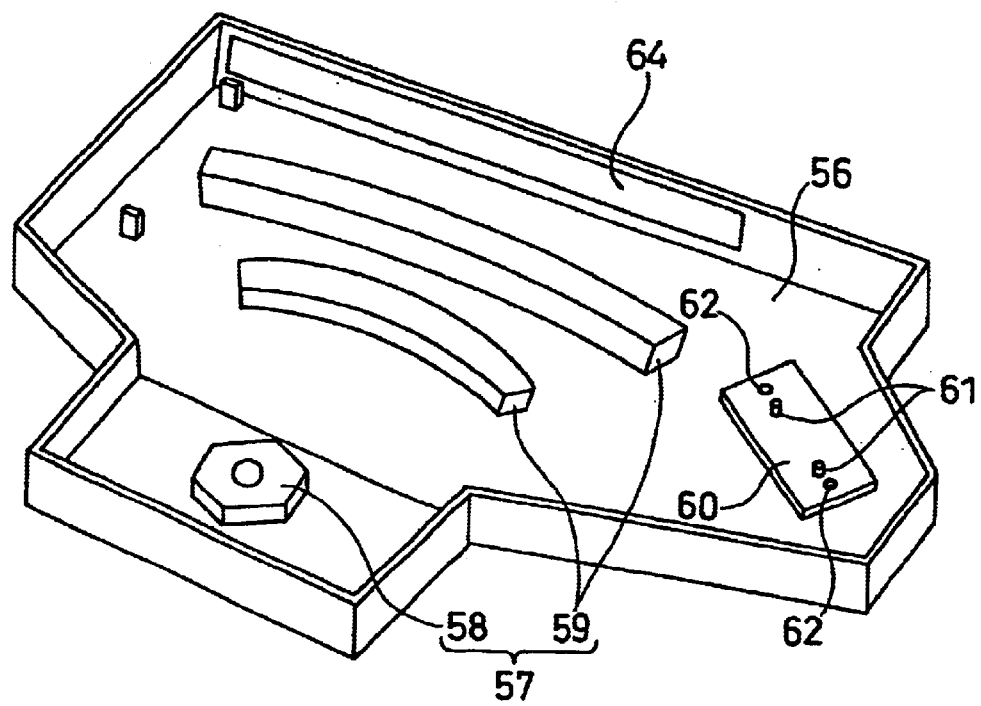
FIG. 19 is a perspective view showing a schematic construction of a body portion of an image forming apparatus to which the multi-beam source unit shown in FIG. 7 is to be mounted.
Figure 20:
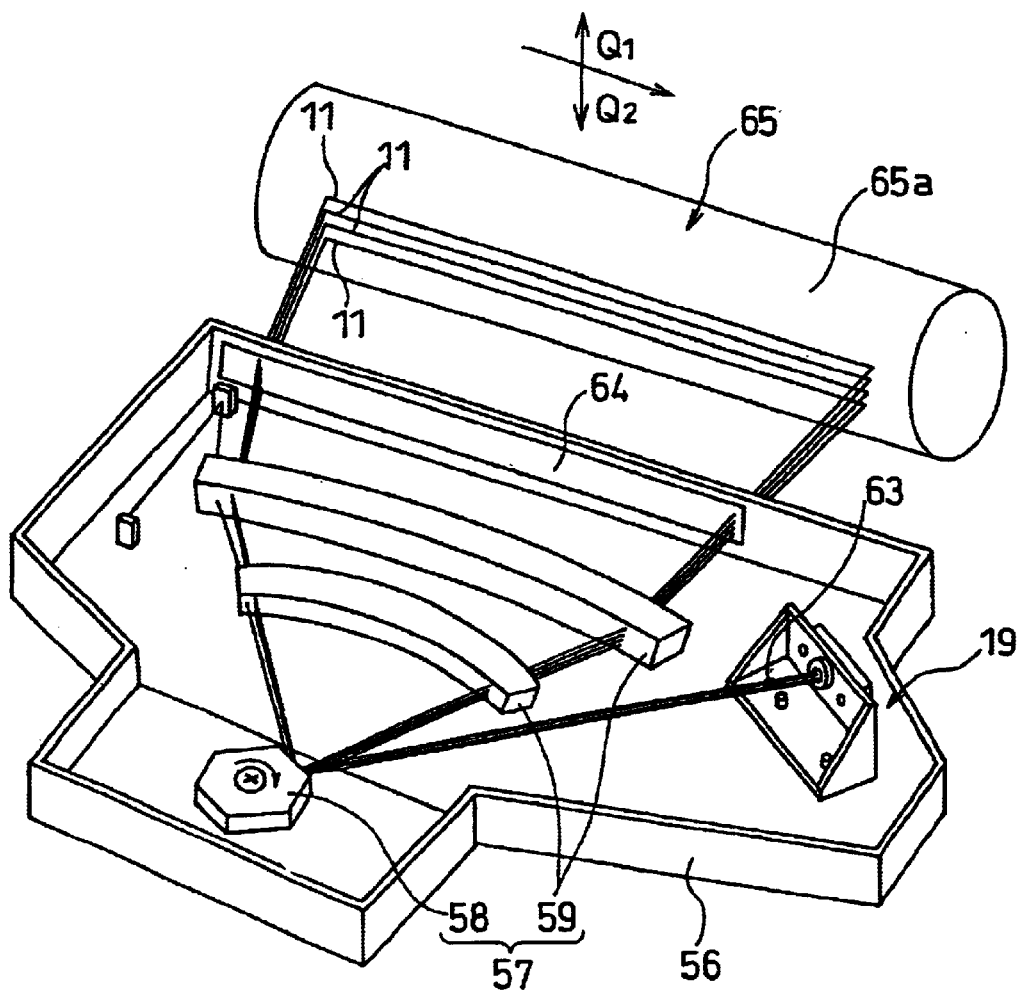
FIG. 20 is a perspective view showing a schematic construction of the body portion of the image forming apparatus with the multi-beam source unit shown in FIG. 7 mounted thereto.

FIGS. 19 and 20 illustrate a schematic construction of a housing of the image forming apparatus body portion, of which FIG. 19 illustrates a state prior to mounting of the multi-beam source unit 19 to a housing 56 and FIG. 20 illustrates a mounted state of the multi-beam source unit 19 to the housing 56.

A scanning optical system 57 is mounted on the housing 56. The scanning optical system 57 is substantially composed of a polygon mirror 58 and fθ lenses 59. A positioning reference portion 60 is provided on the bottom wall of the housing 56. As shown in FIG. 19, the positioning reference portion 60 is provided with a pair of positioning pins 61 and a pair of tapped holes 62. In the multi-beam source unit 19, as in FIG. 20, the reference planes of its positioning reference portions 24 are confronted with a reference plane of the positioning reference portion 60, positioned by the positioning pins 61, and fixed to the positioning reference portion 60 with screws 63.

In one side wall of the housing 56 is formed an opening 64 which extends in a direction parallel to the horizontal direction Q1. When the multi-beam laser diode 31 is driven to activate the light emitting points 45a–45d, multi-laser beams are deflected in the horizontal scanning direction Q1 by the polygon mirror 58, then pass through the opening 64 and are radiated to a photosensitive surface 65a of a photosensitive drum 65 serving as a recording medium to form four beam spots 11 on the photosensitive surface 65a. The four beam spots 11 are substantially aligned in the vertical scanning direction Q2 on the photosensitive surface 65 because the light emitting points 45a–45d of the multi-beam laser diode 31 are adjusted in the vertical scanning direction Q2.

[Explaining the details of the adjusting device for the multi-beam source unit]

Figure 21:
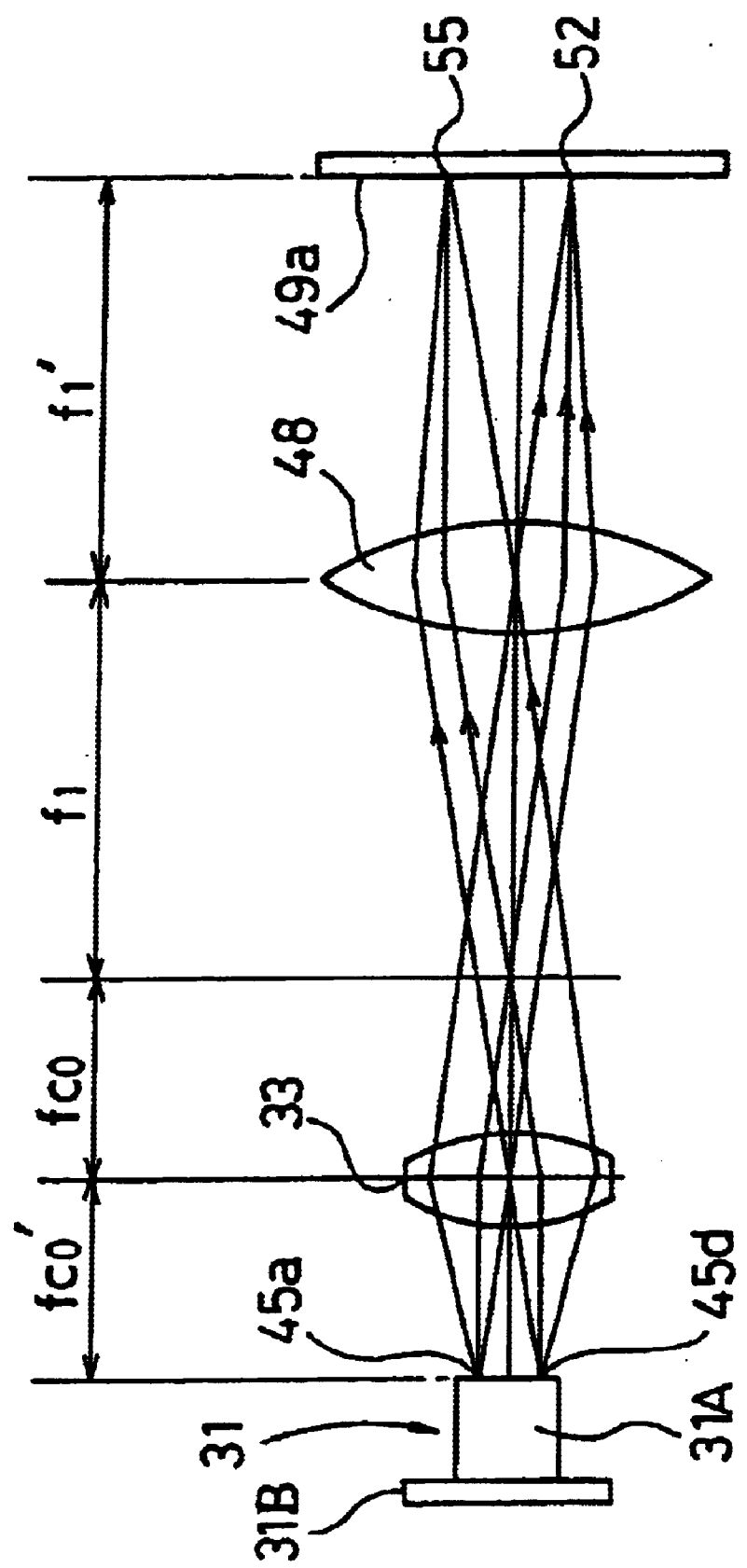
FIG. 21 is a schematic diagram of an optical system in the adjusting device shown in FIG. 16.

FIG. 21 illustrates an optical system of the adjusting system schematically. In the same figure, fco stands for a rear-side local length of the collimator lens 33, fco' stands for a front-side focal length of the collimator lens 33, f1 stands for a front-side focal length of the condenser lens 48, and f1' stands for a rear-side focal length of the condenser lens 48.

An image pickup surface (an area type receiving surface) 49a of the image pickup device 49 is positioned at the rear-side focal length f1 of the condenser lens 48. The front-side focal position of the condenser lens 48 is made substantially coincident with the rear-side focal position of the collimator lens 33.

With the optical system constructed as above, multi-laser beams emitted from the light emitting points 45a–45d of the multi-beam laser diode 31 are substantially collimated by the collimator lens 33 and focused onto the image pickup surface 49a by the condenser lens 48 substantially on a larger scale. Thus, it becomes possible to measure the position of each beam spot with a high accuracy.

Figure 22:
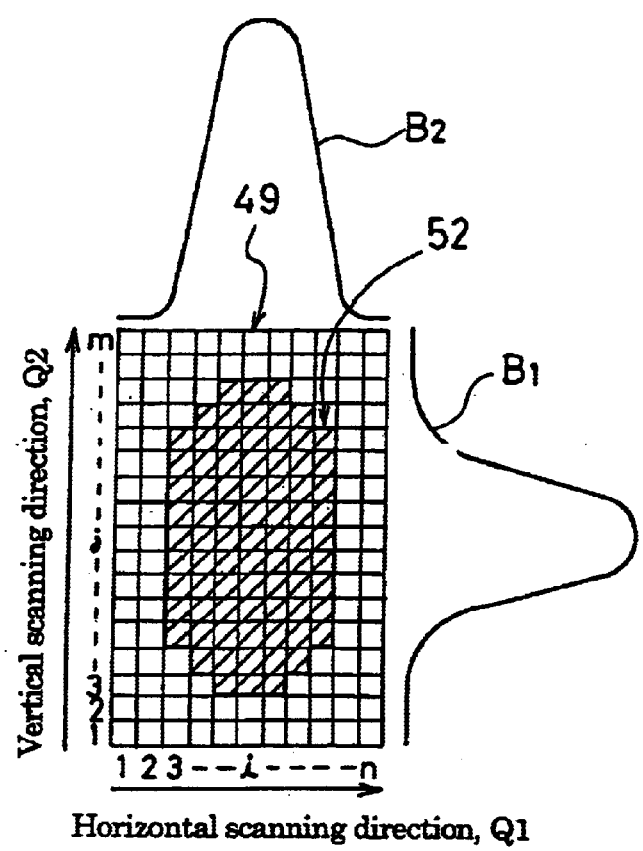
FIG. 22 is a schematic diagram showing an example of a beam spot formed on an image pickup surface shown in FIG. 16.

FIG. 22 is an enlarged view of the beam spot 52 formed on the image pickup surface 49a. The position of each beam spot is determined by calculating a centroid position. An example of how to calculate a centroid position of the beam spot 52 will be described below.

Each pixel of the image pickup surface 49a is defined by the reference mark Zij. The mark Z1j, Z2j, ... Zij, ..., Znj stand for pixels arranged in the horizontal scanning direction Q1, while Zi1, Zi2, ..., Zij, ..., Zim stand for pixels arranged in the vertical scanning direction Q2, and the mark i (integer from 1 to n) stands for the ith position counted from the left-hand side, while the mark j (integer from 1 to m) stands for the jth position counted from below.

Figure 23:
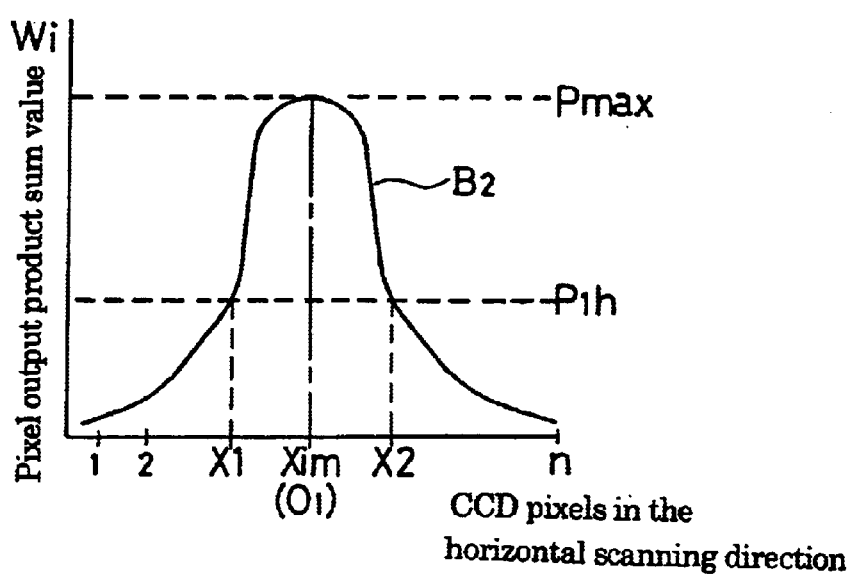
FIG. 23 is an explanatory diagram showing an example of determining a centroid position from a light beam distribution curve shown in FIG. 22.

If the sum total Wj (Wj=Z1j+Z2j+ ... +Zij+ ... +Znj) of output signals outputted from pixels Z1j, Z2j, ..., arranged in the horizontal scanning direction Q1 is obtained successively from j=1 to j=m in the vertical scanning direction Q2, there can be obtained a light beam intensity distribution curve B1 in the vertical scanning direction Q2. Like, if the sum total Wi (Wi=Zi1+Zi2+Zij+ ... +Zim) of output signals outputted from pixels Zi1, Zi2, ..., Zij, ..., Zim arranged in the vertical scanning direction Q2 is obtained successively from i=1 to i=n in the vertical scanning direction Q1, there can be obtained a light beam intensity distribution curve B2 in the horizontal scanning direction Q1. In FIG. 23, a threshold value P1h is set for the beam intensity distribution curve B2, then addresses X1 and X2 of pixels in the horizontal scanning direction Q1 corresponding to the intensities which cross the threshold value P1h are specified, and an address Xim of the pixel corresponding to a mean value of the sum of the addresses X1 and X2 is obtained. In this way there is obtained a centroid position (central position) O1 in the horizontal scanning direction of the beam spot 52. By performing the same processing for the beam intensity distribution curve B1 there is obtained a centroid position (central position) O1' in the vertical scanning direction. The threshold value P1h is set at one over the square of e (natural logarithm) from peak Pmax.

Thus, since the centroid position of the beam spot 52 is calculated on the basis of the entire shape of the beam spot focused on the image pickup surface 49a, it is desirable, for enhancing the calculation accuracy, to constitute an optical system so that the focusing area of each beam spot on the image pickup area 49a is ten times or more as large as the pixel area.

Figure 24:
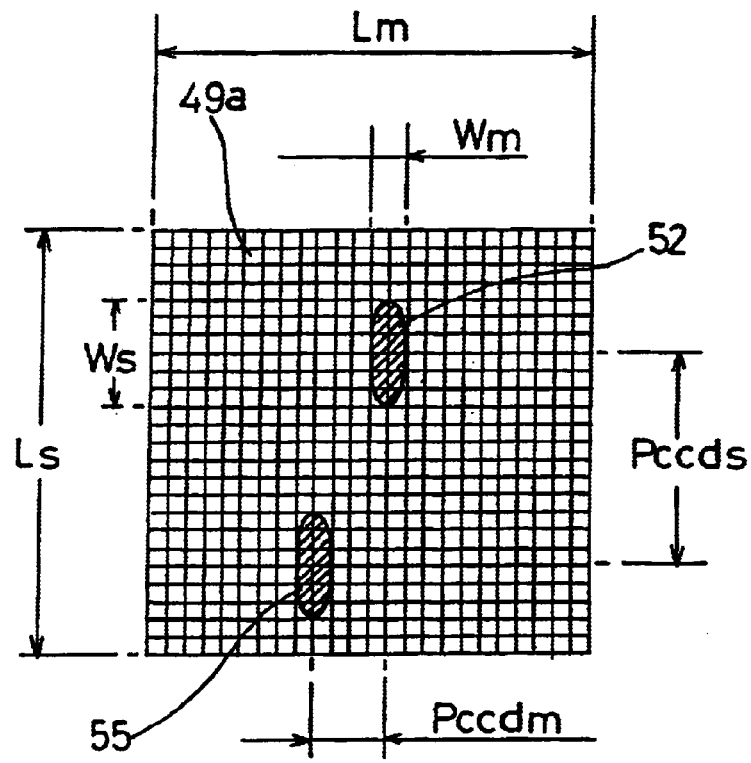
FIG. 24 is a schematic diagram for explaining a relation between a beam spot and the size of the image pickup surface.

More specifically, as shown in FIG. 24, given that the diameter in the horizontal scanning direction of the beam spot 52 on the image pickup surface 49a is Wm, the beam spot diameter in the vertical scanning direction on the image pickup surface is Ws, the diameter in the horizontal scanning direction of the laser beam after passing the slit 36a is Dm', the beam diameter in the vertical scanning direction after the slit is Ds', and the oscillation wavelength of the multi-beam laser diode 31 is $\lambda$, the beam spot diameters Wm and Ws in the horizontal and vertical directions respectively are calculated in accordance with the following equations:

$$Wm = (f \times \lambda)/(\pi \times Dm')$$

$$Ws = (f \times \lambda)/(\pi \times Ds')$$

and the optical system in the adjusting device is designed so as to give:

$$\pi \times Wm \times Ws > \text{pixel area} \times 10$$

Further, if the pitch displacement quantity in the horizontal scanning direction between the remotest light emitting points 45a and 45d is PLDAm, the pitch displacement quantity in the vertical scanning direction between the light emitting points 45a and 45d is LDAs, the pitch in the horizontal scanning direction between the beam spot 52 from the light emitting point 45a and the beam spot 55 from the light emitting point 45 on the image pickup surface 49a is Pccdm, and the pitch in the vertical scanning direction between the beam spot 52 from the light emitting point 45a and the beam spot 55 from the light emitting point 45d on the image pickup surface 49a is Pccds, then a pitch displacement is calculated in accordance with the following equations Pccdm=(f1/fco)×PLDAm and Pccds=(f1/fco)×PLDAs and a magnification of the optical system is set so as to prevent protrusion of both beam spots 52 and 55 of the light emitting points 45a and 45d from the image pickup surface 49a and so as to satisfy the following relationships:

$$Pccdm \times (N-1) + Wm < Lm$$

$$Pccds \times (N-1) + Ws < Ls$$

where Lm stands for an overall length of the image pickup surface 49a in the horizontal direction, Ls stands for an overall length of the image pickup surface 49a in the vertical direction, and N stands for the number of light emitting points (N=4).

So setting the magnification of the optical system is efficient because the evaluation of four light emitting points 45a–45d can be done simultaneously by a singe image pickup device 49.

Figure 25:
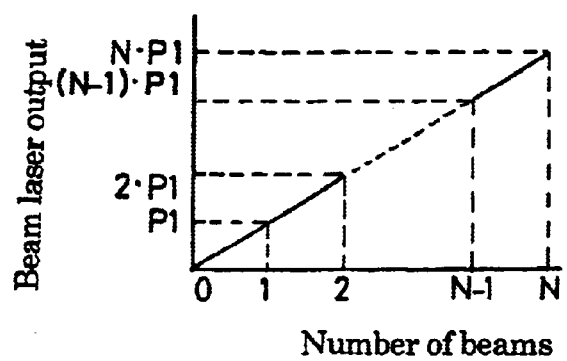
FIG. 25 a diagram showing graphically an example of uniforming outputs of light emitting points.

When the light emitting points 45a–45d are to be turned ON at a time, the following control is made so that the light emitting outputs of the light emitting points 45a–45d become substantially equal to one another. First, any one of the light emitting points 45a–45d is turned ON and the output of the image pickup device 49 based on that activated light emitting point is detected and is stored as a reference output P1. Next, with the light emitting point thus turned ON left as it is, one of the remaining light emitting points is turned ON and a laser drive control circuit is adjusted so that the output of the image pickup device 49 becomes twice its reference output P1. This control adjustment is made successively for the four light emitting points 45a–45d and the laser drive control circuit is adjusted so as to afford an output four times the reference output P1. Generally, in the case where there are N number of light emitting points, the laser drive control circuit is set so as to give an output N times the reference output P1, as shown in FIG. 25.

By so setting the laser drive control circuit it is possible to make constant the intensity of each of the beam spots 52–55 on the image pickup surface 49a and hence possible to accurately evaluate the position of each beam spot.

[Multi-beam source unit and Method for adjusting the same according to the second embodiment]

Figure 26:
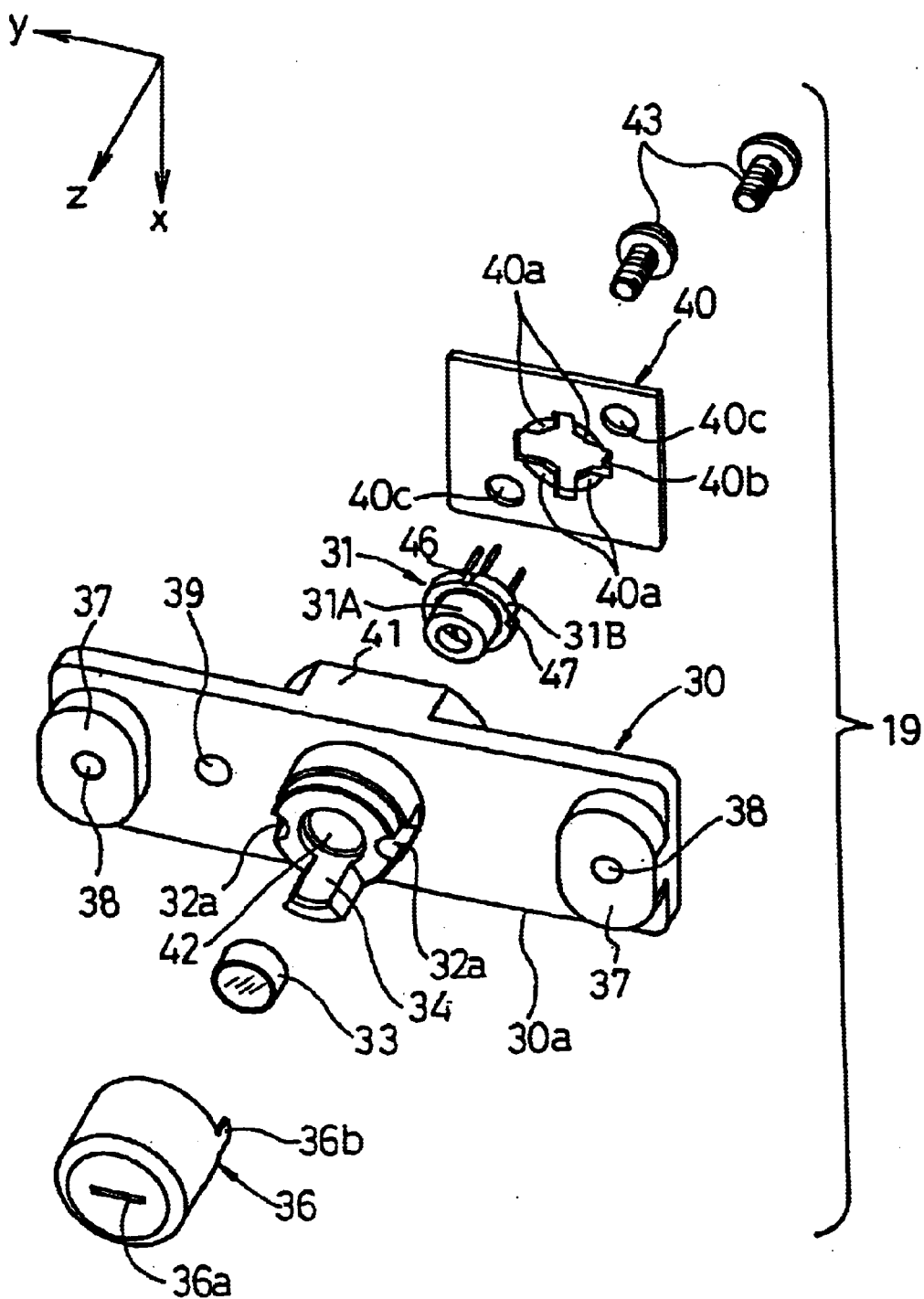
FIG. 26 is an exploded perspective view of a multi-beam source unit according to the second embodiment of the present invention as seen from the front side.
Figure 27:
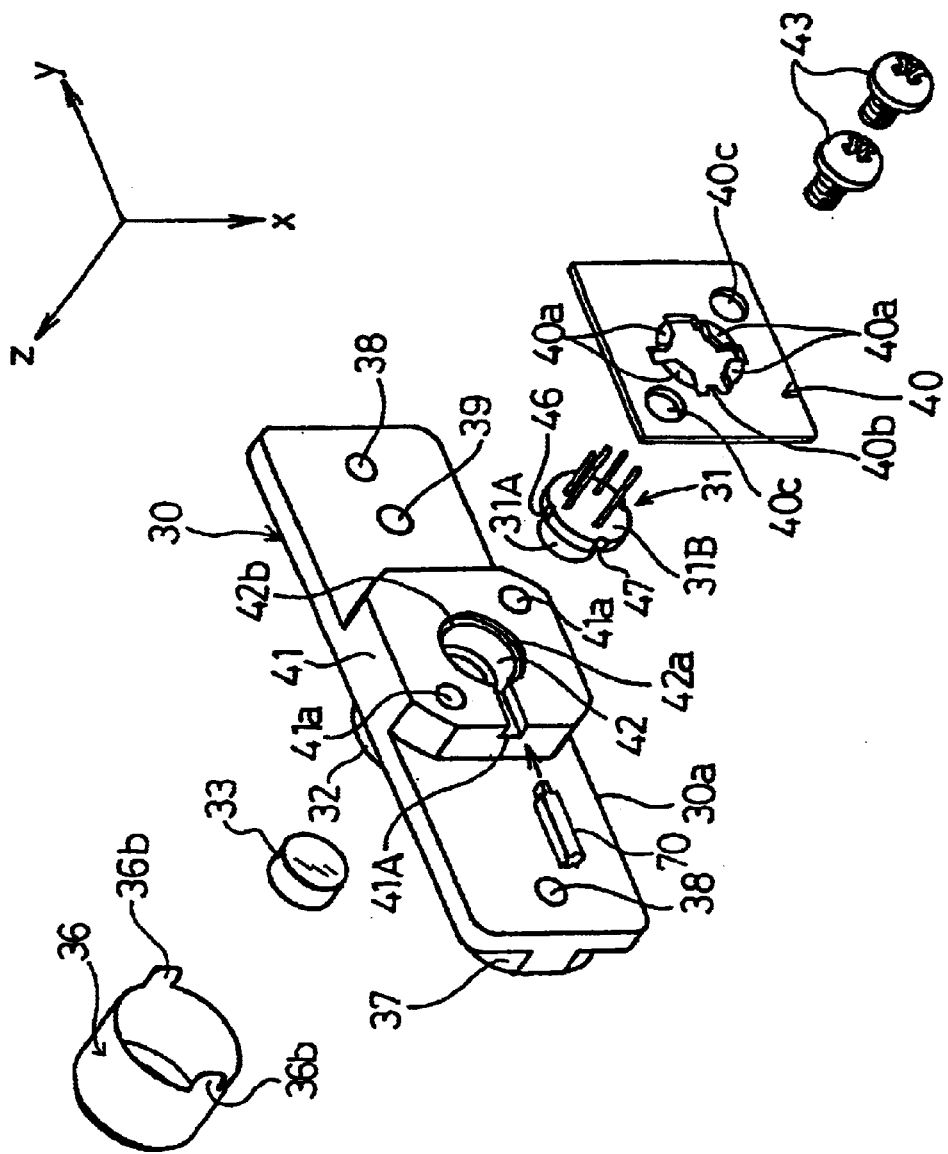
FIG. 27 is an exploded perspective view thereof as seen from the back side thereof.

FIGS. 26 to 28 illustrate a multi-beam source unit 19 according to the second embodiment of the present invention, in which the same components as in the previous first embodiment are identified by the same reference numerals in the first embodiment and detailed explanations thereof will here be omitted, with explanations to be given only about different components.

A pressing plate 40 used in this second embodiment is provided with an engaging piece 40b. The engaging piece 40b is set narrower than the width of the cutout portion 47 and, when the pressing plate 40 is temporarily fixed to the pressing plate mounting portion 41, the engaging piece 40b comes into engagement with the cutout portion 47 of the stem 31B projecting from the back side of the pressing plate mounting portion 41, whereby the stem 31B can be roughly positioned (to about the same degree as the state shown FIG. 14(A)) relative to the pressing plate mounting portion 41.

Thus, there is obtained a roughly positioned state when the pressing plate 40 is temporarily fixed to the pressing plate mounting portion 41 in the mounting work prior to insertion of the jig 70. Therefore, the positioning using the jig 70 becomes easier. Besides, the pressing plate 40 can be applied in common also to another multi-beam source unit which may remain roughly positioned by the engaging piece 40.

As set forth above, in the multi-beam source unit according to the present invention, a positioning groove is formed in the mounting seat portion which supports the multi-beam laser diode rotatably, an engaging recess for aligning the virtual line direction with the standard design line direction is formed in the stem, and the tip of the jig inserted through the positioning groove is brought into engagement with the engaging recess, whereby there is obtained a positioned state with the engaging recess aligned with the positioning groove and thus the multi-beam laser diode can be positioned easily relative to the base member with use of the jig. Besides, since the multi-beam source unit can be adjusted independently before being incorporated into the body portion of the image forming apparatus, it is possible to simplify the mounting work for the image forming apparatus body.

In the adjusting method for the multi-beam source unit according to the present invention, an arranged state of the light emitting points relative to the standard design line is measured on the basis of beam spots on the image surface corresponding to the image recording surface and the multi-beam laser diode is rotated for adjustment around the optical axis of the optical system. Consequently, the arranged direction of the light emitting points can be aligned with the standard design line direction easily.

Particularly, if the arranged direction of the light emitting points is aligned with the vertical scanning direction in advance before the mounting of the multi-beam source unit to the body portion of the image forming apparatus, then the adjusting operation of adjusting the beam spot pitch in the vertical scanning direction after the mounting of the multi-beam source unit to the image forming apparatus body, a complicated construction such that, for correcting write start positions displaced in the horizontal scanning direction by the beam spot pitch adjustment, a sensor for detecting the scanning position of each laser beam is provided for each laser beam in the image forming apparatus body and a write start position is controlled for each laser beam, and a complicated construction such that a time delay in the horizontal scanning direction of each laser beam is measured and a laser beam drive control is performed using a delay circuit, can all be avoided and hence it is possible to reduce the number of components used and also possible to shorten the assembling time required for the mounting to the image forming apparatus body, with consequent attainment of the reduction of cost. The simplification on of control using software can also be attained.

The positioning jig for the multi-beam source unit according to the present invention is provided with a positioning tip portion for tight engagement with the engaging recess and also provided with a guide portion for engagement with the positioning groove, so once the jig is inserted from the positioning groove and its positioning tip portion is brought into tight engagement with the engaging recess, the multi-beam laser diode is positioned relative to the base member, and all that is required after completion of the positioning is a mere extraction of the jig, thus making it possible to provide the jig less expensively and in a re-utilizable state.

The multi-beam source unit assembling method according to the present invention includes a positioning step of positioning the multi-beam source unit with use of a jig at the time of unitizing the same unit, an assembling step of unitizing the multi-beam source unit in the positioned state, a measuring step of measuring an arranged state of the light emitting points, and a rotatively adjusting step of rotatively adjusting the multi-beam source unit so as to align the arranged direction of light emitting points with the standard design line direction on the basis of the measurement of the light emitting points arranged state. Therefore, in the multi-beam source unit assembling process, both the positioning of the multi-beam laser diode and the base member and the adjustment of the beam spots arranged direction in the multi-beam source unit can be done simultaneously. Thus, the multi-beam source unit assembling work can be made efficient.

In the image forming apparatus according the present invention, at the time of mounting the adjusted multi-beam source unit to the body portion of the image forming apparatus, it is possible to simplify the position adjusting work for the scanning optical system.

What is claimed is:

1. A multi-beam source unit including a base member, the base member being provided with a multi-beam laser diode capable of emitting multi-laser beams from a plurality of light emitting points, the multi-beam laser diode having a stem formed with a cutout portion, and also provided with a collimator lens for collimating the multi-laser beams, the multi-beam source unit being designed so as to be set to a optical system on the assumption that the plural light emitting points arranged in the direction of a predetermined standard design line when they are present on a virtual straight line defined by said cutout portion, wherein the base member is formed with a mounting seat portion having a through hole to support the multi-beam laser diode rotatably, the stem is formed with an engaging recess for positioning the direction of the virtual straight line to the direction of the standard design line, the mounting seat portion being formed with a positioning groove which cooperates with the engaging recess to align the direction of the virtual straight line with the direction of the standard design line, a tip of jig is inserted through the positioning groove into engagement with the engaging recess, and in this <1> positioned state the multi-beam laser diode is pressed and fixed into the base member by means of a pressing plate which presses a back side of the stem.

2. A multi-beam source unit according to claim 1, wherein the base member is formed with a fitting cylinder coaxially with the through hole to support the collimator lens and which further includes a mounting bracket for supporting the base member rotatably around an optical axis of the scanning optical system, the mounting bracket having a reference plane adapted to be confronted with a reference plane formed in a body portion of an image forming apparatus and also having a fitting hole to be fitted on the fitting cylinder.

3. A multi-beam source unit according to claim 1, wherein the back side of the stem is projected from the mounting seat portion and the pressing plate is provided with a rough positioning lug to be engaged with a projecting portion of the engaging recess projecting from the mounting seat portion.

4. A method for adjusting a multi-beam source unit including a base member, the base member being provided with a multi-beam laser diode capable of emitting multi-laser beams from a plurality of light emitting points, the multi-beam laser diode having a stem formed with a cutout portion, and also provided with a collimator lens for collimating the multi-laser beams, the multi-beam source unit being designed so as to be set to a scanning optical system on the assumption that the plural light emitting points are arranged in the direction of a predetermined standard design line when they are present on a virtual straight line defined by said cutout portion, wherein the base member is formed with a mounting seat portion having a through hole to support the multi-beam laser diode rotatably, the stem is formed with an engaging recess for positioning the direction of the virtual straight line to the direction of the standard design line, the mounting seat portion being formed with a positioning groove which cooperates with the engaging recess when opposed to the engaging recess with rotation of the stem to align the direction of the virtual straight line with the direction of the standard design line, the multi-beam laser diode, in this positioned state <2>, is pressed and fixed to the base member by means of a pressing plate which presses a back side of the stem, the base member is formed with a fitting cylinder coaxially with the through hole to support the collimator lens, and the multi-beam source unit further includes a mounting bracket for supporting the base member rotatably around an optical axis of the scanning optical system, the mounting bracket having a reference plane adapted to be confronted with a reference plane formed in a body portion of an image forming apparatus and also having a fitting hole to be fitted on the fitting cylinder, the mounting bracket being mounted to the body portion of the image forming apparatus while thus supporting the base member rotatably, the method comprising the steps of:

inserting a jig through the positioning groove, bringing the tip of jig into engagement with the engaging recess to position the multi-beam laser diode to the base member, then in this positioned state of the multi-beam laser diode, fixing the multi-beam laser diode to the base member by the pressing plate;

thereafter, with the base member supported by the mount bracket, measuring an actual state of arrangement of the light emitting points relative to the standard design line on the basis of beam spot positions on an image surface corresponding to an image recording surface; and on the basis of the result of the measurement, rotating the base member, centered at the fitting cylinder, around the optical axis of the scanning optical system with respect to the mounting bracket to align the actual arrangement direction of the light emitting points with the direction of the standard design line.

5. A method for adjusting a multi-beam source unit according to claim 4, wherein the arranged direction of the light emitting points is adjusted so as to become substantially in parallel with a vertical direction.

6. A jig for positioning a multi-beam laser diode in unitizing a multi-beam source unit including a base member, the base member being provided with a multi-beam laser diode capable of emitting multi-laser beams from a plurality of light emitting points, the multi-beam laser diode having a stem formed with a cutout portion, and also provided with a collimator lens for collimating the multi-laser beams, the multi-beam source unit being designed so as to be set to a scanning optical system on the assumption that the plural light emitting points are arranged in the direction of a predetermined standard design line when they are present on a virtual straight line defined by cutout portion, wherein the base member is formed with a mounting seat portion having a through hole to support the multi-beam laser diode rotatably, the stem is formed with an engaging recess for positioning the direction of the virtual straight line to the direction of the standard design line, the mounting seat portion being formed with a positioning groove which cooperates with the engaging recess to align the direction of the virtual straight line with the direction of the standard design line, a tip of jig is inserted through the positioning groove into engagement with the engaging recess, and in this positioned state <3> the multi-beam laser diode is pressed and fixed to the base member by means of a pressing plate which presses a back side of the stem, the jig being pounded with a positioning tip portion for tight engagement with the engaging recess and also provided with a guide portion to be guided by the positioning groove.

7. A jig for positioning a multi-beam laser diode according to claim 6, wherein the positioning tip portion of the jig is tapered toward the tip thereof.

8. A method for assembling a multi-beam source unit, as described in claim 4, further comprising the steps of:

a positioning step for positioning the multi-beam laser diode with use of a jig at the time of press-fitting the multi-beam laser diode into the mounting seat portion;

a mounting step for mounting and fixing the multi-beam laser diode in the positioned state thereof to the base member unrotatably by the pressing plate;

a measuring step for measuring the state of arrangement of the light emitting points by an optical adjusting system; and a rotation adjusting step for adjusting the rotation of the multi-beam source unit on the basis of the measurement of the light emitting points arranged state so that the arranged direction of the light emitting points are aligned with the direction of the standard design line.

* * * * *